(12) United States Patent  
Giles

(10) Patent No.: US 8,478,686 B1  
(45) Date of Patent: Jul. 2, 2013

(54) METHOD OF DETERMINING CREDIT WORTHINESS AND PROFITABILITY

(75) Inventor: Robert E. Giles, Lafayette, LA (US)

(73) Assignee: Advertising Data Technologies, LLC, Lafayette, LA (US)

(*) Notice: Subject to any disclaimer, the term of this patent is extended or adjusted under 35 U.S.C. 154(b) by 209 days.

(21) Appl. No.: 12/841,326

(22) Filed: Jul. 22, 2010

Related U.S. Application Data

(60) Provisional application No. 61/229,552, filed on Jul. 29, 2009.

(51) Int. Cl.
*G06Q 40/00* (2012.01)
(52) U.S. Cl.
USPC .................................................. 705/38; 705/39
(58) Field of Classification Search
USPC ..................................................... 705/38, 39
See application file for complete search history.

(56) References Cited

U.S. PATENT DOCUMENTS

| | | | | |
|---|---|---|---|---|
| 6,611,816 | B2 * | 8/2003 | Lebda et al. | 705/38 |
| 6,950,807 | B2 * | 9/2005 | Brock | 705/38 |
| 2006/0100944 | A1 * | 5/2006 | Reddin et al. | 705/35 |
| 2010/0131390 | A1 * | 5/2010 | Emswiler | 705/27 |

* cited by examiner

*Primary Examiner* — Jagdish Patel
(74) *Attorney, Agent, or Firm* — Jones Walker LLP

(57) ABSTRACT

A method for determining credit worthiness and profitability. A computer program is stored on a computer storage device, which is operatively connected to a display and an input device. The computer program generates a customer screen and includes a database of customer entries. The method includes logging into the computer program, viewing the customer screen on the display, inputting a customer data set and a financing data set for a new customer into the customer screen, and generating a credit score based on the data sets. The data sets and the credit score are stored as a new customer entry in the database. The computer program also generates a disposition screen for inputting and storing a disposition data set with a selected customer data entry. The computer program also generates an analysis screen for generating and viewing a profitability report showing a profitability data set of selected customer entries.

33 Claims, 40 Drawing Sheets

Ad Survey
MAIN MENU: SCORE SHEET MANAGER : ADD/EDIT SCORE SHEET

CREDIT SCORE

LOGOUT — 22

JOHN SMITH
INTERNAL ACCOUNT #2554

EDIT CUSTOMER — 54        PRINT SHEET — 56

SCORED BY: ROBERT WADDELL — 50
STATUS DATE: Tue, NOVEMBER 30, 1999 12:00:00 AM — 52

48

PLEASE PROVIDE ONE RESPONSE TO EACH OF THE FOLLOWING QUESTIONS. ONCE EVERY QUESTION IN EACH SECTION HAS BEEN ANSWERED, A SUBTOTAL WILL BE GIVEN. WHEN ALL QUESTIONS ARE COMPLETE, A TOTAL WILL BE GIVEN.

1. RESIDENCE STATUS
   ○ LIVES W/ OTHERS — 58
   ○ LIVES W/ PARENTS — 60
   ○ RENTING — 62
   ○ LEASING — 64
   ○ OWN — 66

2. TIME AT RESIDENCE
   ○ 0-6 MONTHS — 68
   ○ 7-12 MONTHS — 70
   ○ 13-35 MONTHS — 72
   ○ 3-5 YEARS — 74
   ○ 5+ YEARS — 76

3. RESIDENCE CHANGES IN THE LAST TWO YEARS
   ○ 4 — 78
   ○ 3 — 80
   ○ 2 — 82
   ○ 1 — 84
   ○ 0 — 86

FIG. 3A

4. TIME IN AREA
- 88 — 0-12 MONTHS
- 90 — 13-59 MONTHS
- 92 — 5-10 YEARS
- 94 — 11-25 YEARS
- 96 — 25+ YEARS

5. EMPLOYMENT TIME
- 98 — 0-6 MONTHS
- 100 — 7-12 MONTHS
- 102 — 13-35 MONTHS
- 104 — 3-5 YEARS
- 106 — 5+ YEARS

6. EMPLOYMENT CHANGES IN THE LAST TWO YEARS
- 108 — 4
- 110 — 3
- 112 — 2
- 114 — 1
- 115 — 0

7. EMPLOYMENT LAPSES
- 116 — 4
- 118 — 3
- 120 — 2
- 122 — 1
- 124 — 0

8. GROSS INCOME
- 126 — $600 - $1,499
- 128 — $1,500 - $1,999
- 130 — $2,000 - $2,499
- 132 — $2,500 - $2,999
- 134 — $3,000+

*FIG. 3B*

9. POSITIVE AUTO CREDIT
- 136 — NONE
- 138 — 1 GOOD CAR CREDIT
- 140 — 1 GOOD IN HOUSE
- 142 — 2 GOOD CAR CREDITS
- 144 — 2 GOOD IN HOUSE

10. RESPOSSESSIONS
- 146 — 3 OR MORE EVER
- 148 — 3 IN 3 YEARS
- 150 — 2 IN 3 YEARS
- 152 — 1 IN 3 YEARS
- 154 — 0

11. TIME IN BUREAU
- 156 — 0-5 YEARS
- 158 — 6-10 YEARS
- 160 — 11-20 YEARS
- 162 — 21-30 YEARS
- 164 — 30+ YEARS

12. BEACON SCORE
- 166 — 0-425
- 168 — 426-475
- 170 — 476-525
- 172 — 526-575
- 174 — 576+
- 178 — STABILITY: 48

13. VEHICLE TYPE
- 180 — ALL OTHERS
- 182 — NISSAN, TOYOTA, HONDA, V8 TRUCKS, SUV's

14. MILEAGE
- 184 — 120K+
- 186 — 120K - 100K
- 188 — 100K - 80K

15. CAPITALIZED COST / SALES PRICE
194 — ○ $11001+
196 — ○ $11000 - $9501
198 — ○ $9500 - $8501
200 — ○ $8500 - $7501
202 — ○ $7,500 - $0

16. DUE AT SIGNING / DOWN PAYMENT
204 — ○ $500 - $999
206 — ○ $1,000 - $1,499
208 — ○ $1,500 - $2,249
210 — ○ $2,250 - $2,999
212 — ○ $3,000+

17. PERCENTAGE OF COST / ACV
214 — ○ 21-25%
216 — ○ 26-35%
218 — ○ 36%+
220 — ○
222 — ○

18. PERCENTAGE OF EXPENDABLE INCOME
224 — ○ 50-45%
226 — ○ 40-44%
228 — ○ 35-39%
230 — ○ 30-34%

232 — DEAL STRUCTURE: 80

TOTAL: 128 — 234

236 — [CANCEL]  [SAVE CREDIT SHEET] — 238

FIG. 3D

Ad SURVEY — 308
MAIN MENU: REPOSSESSIONS: INSURANCE LOSS CANDIDATES
CREDIT SCORE
22 — LOGOUT

292 — [CREDIT SCORE SHEETS]  294 — [DECLINED CUSTOMERS]  310 — [REPOSSESSIONS]

312 →

HIDE FILTER OPTIONS
DEALERSHIP: [SELECT LOCATION: ☐] — 316
LOCATION: [☐] [ADD TO LIST] — 322
318 — BOSSIER

LAST NAME: [ ] — 326, 328
START DATE: [09/01/2007] — 330
END DATE: [07/01/2009] — 332
SCORED BY: [CYRSTAL / RACHEL / DAVID ALDRIDGE] — 334
ZIP:
[RUN FILTER] — 336

320 —
[REMOVE]
324 —

NEXT >>

| CUSTOMER'S NAME | LOCATION | SALES DATE | SCORED BY | ZIP |
|---|---|---|---|---|
| BRENDA | BOSSIER | 07/04/2008 | JOHN | 71129 |
| ASIA | BOSSIER | 09/18/2008 | JOHN | 71111 |
| SIDNEY | BOSSIER | 09/19/2008 | JOSH | 71037 |
| CHERYL | BOSSIER | 09/23/2008 | JOSH | 71129 |
| SANDRA | BOSSIER | 09/25/2008 | JOSH | 71064 |
| REGINALD | BOSSIER | 09/30/2008 | JOSH | 71107 |
| THERESA | BOSSIER | 10/03/2008 | JOSH | 71111 |

```
                                              ┌─ 392              22
                    Ad SURVEY                 │      CREDIT SCORE  ╲
MAIN MENU: REPOSSESSIONS: ADD/EDIT REPOSSESSION FORM ◄              LOGOUT

┌─ PLEASE COMPLETE THE INSURANCE FORM BELOW:     ─── 358
342─┤  CUSTOMER: HAYES (99)        DEL DATE: [    ]
344─┤  LOCATION: BOSSIER      LAST PAYMENT DATE: [    ]
    │                                               ─── 360
346─┤  STOCK #: [          ]        REPO DATE: [    ]
348─┤  YEAR: [   ]                               ─── 394
350─┤  MAKE:  [          ]       BEGINNING MILES: [   ] ─── 364
352─┤  MODEL: [          ]         ENDING MILES: [   ] ─── 366
354─┤  DAYS: 0
356─┤  MILES: 0

FINANCIALS:
368─┤  PRINCIPLE BALANCE: [$ ]   ORIGINAL ACV: [$ ] ─── 376
370─┤       CURRENT ACV:  [$ ]       DOWN PAY: [$ ] ─── 378
372─┤          TOTAL PAY: [$ ]       Warr Ref.: [$ ] ─── 380
374─┤      REPAIRS TO REPO: [$ ]

REASON REPOSSESSED: (SELECT ONE)   DETAILS OF REASON REPOSSESSED:
```

Ad SURVEY — 400 — CREDIT SCORE — 22
MAIN MENU: REPOSSESSIONS: PAID_CANDIDATES — LOGOUT
292 — 294 — 310
[CREDIT SCORE SHEETS] [DECLINED CUSTOMERS] [REPOSSESSIONS]
312

HIDE FILTER OPTIONS
DEALERSHIP: SELECT LOCATION: ☐    LAST NAME: _____
LOCATION: ☐ [ADD TO LIST]    START DATE: 09/01/2007
        BOSSIER    END DATE: 07/01/2009

SCORED BY: CYRSTAL / RACHEL / DAVID ALDRIDGE

[REMOVE]

ZIP:

[RUN FILTER]
NEXT >>

| CUSTOMER'S NAME | LOCATION | SALES DATE | SCORED BY | ZIP |
|---|---|---|---|---|
| BRENDA | BOSSIER | 07/04/2008 | JOHN | 71129 |
| ASIA | BOSSIER | 09/18/2008 | JOHN | 71111 |
| SIDNEY | BOSSIER | 09/19/2008 | JOSH | 71037 |
| CHERYL | BOSSIER | 09/23/2008 | JOSH | 71129 |
| SANDRA | BOSSIER | 09/25/2008 | JOSH | 71064 |
| REGINALD | BOSSIER | 09/30/2008 | JOSH | 71107 |
| THERESA | BOSSIER | 10/03/2008 | JOSH | 71111 |

MAIN MENU: REPOSSESSIONS: CHARGE_CANDIDATES

Ad SURVEY — 406 — CREDIT SCORE — 22 LOGOUT

— 292 — CREDIT SCORE SHEETS | — 294 — DECLINED CUSTOMERS | — 310 — REPOSSESSIONS

312

HIDE FILTER OPTIONS

| DEALERSHIP: | SELECT LOCATION: ☐ |
| LOCATION: | ☐ ADD TO LIST |
|  | BOSSIER |

LAST NAME: [ ]
START DATE: 09/01/2007
END DATE: 07/01/2009
SCORED BY: CYRSTAL / RACHEL / DAVID ALDRIDGE
ZIP:

390

REMOVE

RUN FILTER

NEXT >>

| CUSTOMER'S NAME | LOCATION | SALES DATE | SCORED BY | ZIP |
| --- | --- | --- | --- | --- |
| BRENDA | BOSSIER | 07/04/2008 | JOHN | 71129 |
| ASIA | BOSSIER | 09/18/2008 | JOHN | 71111 |
| SIDNEY | BOSSIER | 09/19/2008 | JOSH | 71037 |
| CHERYL | BOSSIER | 09/23/2008 | JOSH | 71129 |
| SANDRA | BOSSIER | 09/25/2008 | JOSH | 71064 |
| REGINALD | BOSSIER | 09/30/2008 | JOSH | 71107 |
| THERESA | BOSSIER | 10/03/2008 | JOSH | 71111 |

MAIN MENU: DECLINED FORMS    Ad SURVEY         412         CREDIT SCORE      22
                                    292      310                            LOGOUT
                          CREDIT SCORE SHEETS  REPOSSESSIONS
414

HIDE FILTER OPTIONS
DEALERSHIP: :SELECT LOCATION:      ☐      START DATE: [ ]
LOCATION:                   ☐  ADD TO LIST  END DATE :  [ ]
                                          ☐ SHOW ONLY CUSTOMERS WITH NO FORM

REMOVE
                                                RUN FILTER

DATE DECLINED    CUSTOMER'S NAME   INTERNAL Acc #   FORM ID   PROCESS STATUS
      CARS           BOSSIER
        --                    KAMELIA       99          --             --

FIG. 13

```
                                    22
                 Ad SURVEY    ─416   CREDIT SCORE
MAIN MENU: DECLINED FORMS: ADD/EDIT DECLINED FORM              LOGOUT

PLEASE COMPLETE THE DECLINE FORM BELOW:
                                                          ─428
        CUSTOMER: MCKINNEY (99)    APPLICATION DATE: [    ]
418─                                                      ─430
        LOCATION: BOSSIER          DECLINE DATE:      [    ]
420─
        ADDRESS: [         ]       DATE CREATED: 07/09/2009  ─432
422─    CITY:    [         ]       LAST EDITED:  07/09/2009  ─434
        STATE:   PLEASE SELECT □
        ZIP:     [         ]
                                                             ─436
        NOTICE CONTACT: [      ]   □ DECISION BASED ON CREDIT AGENCY
424─                                                         ─438
        CREDIT AGENCY:  [      ]   □ DECISION BASED ON OTHER SOURCE
426─
REASON DECLINED: (SELECT ONE)

○ CREDIT APPLICATION INCOMPLETE    ○ INCOME INSUFFICIENT FOR AMOUNT
  ○ TEMPORARY RESIDENCE                OF CREDIT REQUIRED
  ○ INSUFFICIENT NUMBER OF CREDIT    ○ DELINQUENT PAST OR PRESENT     ─440
    REFERENCES PROVIDED                CREDIT OBLIGATIONS WITH OTHERS
  ○ UNABLE TO VERIFY RESIDENCE       ○ EXCESSIVE OBLIGATIONS IN
  ○ UNACCEPTABLE TYPE OF CREDIT        RELATION TO INCOME
    REFERENCES PROVIDED              ○ GARNISHMENT, ATTACHMENT, FORECLOSURE,
                                       REPOSSESSION, COLLECTION ACTION, OR
```

FIG. 14A

○ NO CREDIT FILE                         JUDGMENT
○ UNABLE TO VERIFY CREDIT REFERENCES     ○ UNABLE TO VERIFY INCOME
○ LIMITED CREDIT EXPERIENCE              ○ BANKRUPTCY
○ LENGTH OF EMPLOYMENT                   ○ LENGTH OF RESIDENCE
○ POOR CREDIT PERFORMANCE WITH US        ○ VALUE OR TYPE OF COLLATERAL NOT SUFFICIENT
                                         ○ INADEQUATE CASH DOWN PAYMENT OR TRADE-IN
                                         ○ OTHER

[CANCEL] [PRINT FORM] [SAVE FORM]
  382      384         386

FIG. 14B

| SCORE | LOC | Yr | MODEL | REPO DATE | Rea | Days | Miles | Prin Bal | Orig ACV | Curr. Acv ($) | DOWN PAY ($) | TOTAL PAY ($) | Warr Ref. ($) | Tot Col | Rep TO Repo | CASH GAIN/ LOSS | BOOK WRITE-OFF |
|---|---|---|---|---|---|---|---|---|---|---|---|---|---|---|---|---|---|
| 547 | PINHOOK | 2000 | PONTIAC GRAND AM | 1/30/07 | 5 | 715 | 22,245 | $6,102 | $8,117 | $2,190 | $2,031 | $9,655 | $0 | $13 | | | |
| 630 | PINHOOK | 2001 | CHEVROLET TAHOE | 1/14/09 | 2 | 282 | 7,450 | $11,635 | $9,696 | $5,500 | $2,116 | $3,110 | $321 | $11 | | | |
| 702 | PINHOOK | 1998 | GMC JIMMY | 3/27/08 | | 514 | 18,752 | $9,006 | $6,576 | $2,325 | $865 | $5,656 | $160 | $9, | | | |
| 682 | PINHOOK | 2001 | CHRYLER 300M | 1/2/09 8/8/07 | 5 | 1,139 | 109,683 | $10,663 | $10,103 | $0 | $2,805 | $5,196 | $0 | $8, | | | |
| 728 | PINHOOK | 2004 | CHEVROLET TRAIL BLAZER | 12/9/05 | 8 | 306 | 12,545 | $11,509 | $9,969 | $5,275 | $2,364 | $6,011 | $321 | $13 | | | |
| 739 | PINHOOK | 1998 | BMW 3 SERIES | 1/21/09 3/27/08 | 5 | 650 | 23,717 | $7,641 | $9,936 | $3,500 | $2,068 | $10,641 | $69 | $16 | | | |
| 558 | PINHOOK | 2000 | DODGE INTREPID | 1/26/09 4/18/07 | 5 | 1,070 | 62,821 | $3,452 | $8,032 | $95 | $2,226 | $13,269 | $0 | $15 | | | |
| 659 | PINHOOK | 2001 | OLDSMOBILE ALERO | 1/26/09 2/21/06 | 3 | 545 | 35,400 | $6,315 | $5,083 | $2,324 | $1,136 | $5,146 | $160 | $8, | | | |
| 626 | PINHOOK | 2001 | CADILLAC DEVILLE | 1/26/09 8/2/07 | 5 | 157 | 4,142 | $11,272 | $8,369 | $5,595 | $1,932 | $1,815 | $435 | $9, | | | |
| 663 | PINHOOK | 2001 | FORD EXPEDITION | 8/25/08 1/27/09 5/23/08 1/28/09 1/29/09 | 1 5 | 252 | 11,463 | $11,178 | $6,600 | $3,500 | $2,454 | $3,035 | $367 | $9, | | | |

| | | | MAKE | DEL DATE | | | | | | | | | | | | | |
|---|---|---|---|---|---|---|---|---|---|---|---|---|---|---|---|---|---|
| SCORE | LOC | Yr | MODEL | REPO DATE | Rea | Days | Miles | Prin Bal | Orig ACV | Curr. Acv ($) | DOWN PAY ($) | TOTAL PAY ($) | Warr Ref. ($) | Tot Col | Rep TO Repo | CASH GAIN/ LOSS | BOOK WRITE-OFF |
| 761 | PINHOOK | 2000 | FORD F150 | 11/28/06 1/30/09 | 2 | 794 | 69,355 | $7,812 | $9,364 | $2,843 | $2,042 | $10,394 | $0 | $15 | | | |
| 638 | PINHOOK | 1998 | FORD | 4/4/07 | 5 | 668 | 42,189 | $8,832 | $10,772 | $2,618 | $1,234 | $11,396 | $69 | $15 | | | |

FIG. 18B

| SCORE | LOC | Yr | MAKE MODEL | DEL DATE REPO DATE | Rea | Days | Miles | Prin Bal | Orig ACV | Curr. Acv ($) | DOWN PAY ($) | TOTAL PAY ($) | Warr Ref. ($) | Tot Col | Rep TO Repo | CASH GAIN/ LOSS | BOOK WRITE-OFF |
|---|---|---|---|---|---|---|---|---|---|---|---|---|---|---|---|---|---|
| 674 | PINHOOK | 2000 | EXPEDITION | 1/30/09 | 3 | 1,017 | 60,643 | $6,881 | $8,990 | $2,209 | $2,741 | $9,948 | $0 | $14 | | | |
| 688 | PINHOOK | 1998 | CHEVROLET SILVERADO | 3/25/06 1/5/09 | 2 | 311 | 33,514 | $9,849 | $7,151 | $1,504 | $1,615 | $2,825 | $321 | $6, | | | |
| | | | MITSUBISHI MONTERO SPORT | 12/4/07 10/10/08 | | | | | | | | | | | | | |
| 645 | PINHOOK | 2003 | KIA SEDONA | 11/22/06 10/14/08 | 5 | 692 | 69,872 | $6,020 | $6,090 | $1,230 | $1,638 | $7,947 | $23 | $10 | | | |
| 527 | PINHOOK | 2002 | PONTIAC GRAND AM | 1/25/07 10/15/08 | 3 | 629 | 31,699 | $6,819 | $6,964 | $1,768 | $1,797 | $4,375 | $69 | $8, | | | |
| 532 | PINHOOK | 2001 | HONDA CIVIC | 5/15/07 10/16/08 | 8 | 520 | 17,506 | $6,635 | $6,995 | $4,000 | $1,567 | $6,944 | $160 | $12 | | | |
| 795 | PINHOOK | 1998 | FORD EXPEDITION | 9/30/05 10/20/08 | 1 | 1,116 | 26,172 | $3,770 | $10,037 | $2,812 | $2,950 | $16,896 | $0 | $22 | | | |
| 603 | PINHOOK | 2002 | FORD EXPLORER | 1/5/08 10/20/08 | 5 | 289 | 20,884 | $10,417 | $7,292 | $2,480 | $1,745 | $2,834 | $344 | $7, | | | |
| 624 | PINHOOK | 1998 | VOLVO S70 | 1/27/07 10/20/08 | 5 | 632 | 49,183 | $7,051 | $8,697 | $1,230 | $2,066 | $9,524 | $69 | $12 | | | |
| 562 | PINHOOK | 2003 | FORD TAURUS | 2/12/08 10/21/08 | 2 | 252 | 12,000 | $9,458 | $7,479 | $5,000 | $1,855 | $3,128 | $367 | $10 | | | |
| 759 | PINHOOK | 2000 | TOYOTA AVALON | 6/3/06 10/22/08 | 5 | 872 | 40,028 | $4,889 | $9,484 | $2,140 | $2,100 | $13,524 | $0 | $17 | | | |
| 635 | PINHOOK | 2004 | CHRYSLER SEBRING | 1/31/07 10/23/08 | 8 | 631 | 24,944 | $6,284 | $5,176 | $1,528 | $1,444 | $6,551 | $46 | $9, | | | |
| 669 | PINHOOK | 2002 | HONDA | 5/22/08 | 1 | 155 | 8,038 | $12,103 | $8,656 | $4,500 | $1,794 | $1,735 | $435 | $8, | | | |

FIG. 18C

| SCORE | LOC | Yr | MAKE MODEL | DEL DATE REPO DATE | Rea | Days | Miles | Prin Bal | Orig ACV | Curr. Acv ($) | DOWN PAY ($) | TOTAL PAY ($) | Warr Ref. ($) | Tot Col | Rep TO Repo | CASH GAIN/ LOSS | BOOK WRITE-OFF |
|---|---|---|---|---|---|---|---|---|---|---|---|---|---|---|---|---|---|
| 560 | PINHOOK | 2002 | ACCORD | 10/24/08 | | | | | | | | | | | | | |
| 558 | PINHOOK | 2001 | PONTIAC GRAND PRIX | 3/14/07 | 2 | 597 | 62,515 | $7,080 | $6,697 | $1,709 | $1,490 | $7,693 | $92 | $10 | | | |
| 451 | PINHOOK | 1999 | CHEVROLET SUBURBAN | 12/15/07 | 5 | 297 | 16,688 | $11,513 | $10,627 | $5,675 | $2,425 | $4,399 | $321 | $12 | | | |
| 602 | PINHOOK | 1998 | DODGE RAM | 10/7/08 9/4/06 | 4 | 765 | 42,813 | $6,455 | $7,996 | $2,380 | $3,554 | $6,290 | $0 | $12 | | | |
| 484 | PINHOOK | 2000 | PONTIAC BONNEVILLE | 10/8/08 2/5/07 | 1 | 645 | 55,744 | $6,603 | $6,553 | $175 | $1,738 | $6,978 | $69 | $8, | | | |
| 426 | PINHOOK | 1998 | CHRYSLER CONCORDE | 11/11/08 2/8/07 | 8 | 645 | 58,089 | $6,189 | $6,651 | $1,153 | $1,700 | $7,990 | $69 | $10 | | | |
| | | | CHEVROLET SUBURBAN | 11/14/08 3/8/07 | 5 | 617 | 25,336 | $8,715 | $9,088 | $2,115 | $425 | $9,991 | $92 | $12 | | | |
| SCORE | LOC | Yr | MAKE MODEL | DEL DATE REPO DATE | Rea | Days | Miles | Prin Bal | Orig ACV | Curr. Acv ($) | DOWN PAY ($) | TOTAL PAY ($) | Warr Ref. ($) | Tot Col | Rep TO Repo | CASH GAIN/ LOSS | BOOK WRITE-OFF |
| 699 | PINHOOK | 1999 | CHRYSLER 300M | 10/11/05 | 4 | 1,135 | 59,201 | $6,832 | $8,330 | $2,465 | $2,396 | $9,399 | $0 | $14 | | | |
| 705 | PINHOOK | 1998 | FORD EXPEDITION | 11/18/08 2/13/06 | 4 | 1,009 | 57,320 | $8,038 | $10,846 | $1,514 | $3,189 | $10,597 | $0 | $15 | | | |
| 405 | PINHOOK | 1999 | INFINITI G20 | 11/18/08 8/31/06 | 2 | 817 | 34,519 | $4,561 | $6,052 | $1,030 | $1,358 | $10,160 | $0 | $12 | | | |
| 738 | PINHOOK | 2003 | CHEVROLET TAHOE | 11/24/08 4/3/08 | 8 | 240 | 8,140 | $12,518 | $10,846 | $7,000 | $1,619 | $4,476 | $390 | $13 | | | |
| 719 | PINHOOK | 2001 | FORD EXPEDITION | 11/28/08 1/19/07 | 5 | 655 | 21,652 | $8,435 | $10,847 | $3,500 | $3,271 | $9,894 | $46 | $16 | | | |
| 562 | PINHOOK | 2001 | NISSAN PATHFINDER | 11/4/08 2/4/08 12/1/08 | 1 | 301 | 13,433 | $11,294 | $10,160 | $2,500 | $2,285 | $3,987 | $321 | $9, | | | |

*FIG. 18D*

| SCORE | LOC | Yr | MAKE MODEL | DEL DATE REPO DATE | Rea | Days | Miles | Prin Bal | Orig ACV | Curr. Acv ($) | DOWN PAY ($) | TOTAL PAY ($) | Warr Ref. ($) | Tot Col | Rep TO Repo | CASH GAIN/ LOSS | BOOK WRITE-OFF |
|---|---|---|---|---|---|---|---|---|---|---|---|---|---|---|---|---|---|
| 580 | PINHOOK | 2001 | FORD ESCAPE | 1/6/07 | 5 | 695 | 30,380 | $6,853 | $8,810 | $2,940 | $2,952 | $7,266 | $23 | $13 | | | |
| 604 | PINHOOK | 1999 | CHRYSLER 300M | 12/1/08 | 3 | 1,795 | 52,500 | $334 | $7,776 | $244 | $1,771 | $18,253 | $0 | $20 | | | |
| 522 | PINHOOK | 2000 | INFINITI I30 | 1/2/04 12/16/05 12/1/08 | 3 | 1,095 | 43,602 | $7,155 | $10,702 | $2,830 | $3,093 | $11,118 | $0 | $12 | | | |
| 653 | PINHOOK | 1998 | PONTIAC GRAND PRIX | 12/15/08 10/15/04 12/15/08 | 3 | 1,523 | 43,222 | $1,447 | $7,000 | $1,907 | $3,092 | $13,751 | $0 | $18 | | | |
| SCORE | LOC | Yr | MAKE MODEL | DEL DATE REPO DATE | Rea | Days | Miles | Prin Bal | Orig ACV | Curr. Acv ($) | DOWN PAY ($) | TOTAL PAY ($) | Warr Ref. ($) | Tot Col | Rep TO Repo | CASH GAIN/ LOSS | BOOK WRITE-OFF |
| 617 | PINHOOK | 1999 | CHRYSLER 300M | 12/22/04 12/18/08 | 2 | 1,457 | 89,111 | $2,590 | $9,058 | $1,020 | $3,817 | $11,336 | $0 | $16 | | | |
| 613 | PINHOOK | 1999 | MERCURY SABLE | 12/31/07 12/2/08 | 3 | 337 | 15,344 | $7,568 | $6,527 | $649 | $2,315 | $2,782 | $275 | $6, | | | |
| 711 | PINHOOK | 2003 | CHRYSLER SEBRING | 3/11/06 12/22/08 | 2 | 1,017 | 39,840 | $4,133 | $10,327 | $244 | $2,703 | $14,818 | $0 | $17 | | | |
| 613 | PINHOOK | 2000 | HONDA ACCORD | 3/14/08 12/26/08 | 2 | 288 | 13,500 | $9,013 | $6,648 | $555 | $1,684 | $3,615 | $344 | $6, | | | |
| 592 | PINHOOK | 1998 | FORD MUSTANG | 7/28/06 12/26/08 | 1 | 883 | 485 | $6,717 | $7,561 | $630 | $1,616 | $9,975 | $0 | $12 | | | |
| 503 | PINHOOK | 2002 | FORD EXPLORER | 10/24/08 12/29/08 | 2 | 67 | 6,287 | $12,415 | $7,903 | $6,800 | $1,057 | $455 | $504 | $8, | | | |
| 577 | PINHOOK | 2000 | HONDA ACCORD | 1/3/08 12/31/08 | 2 | 363 | 33,596 | $9,798 | $8,351 | $3,744 | $2,061 | $3,960 | $275 | $10 | | | |
| 675 | PINHOOK | 2003 | MERCURY SABLE | 11/23/07 12/5/08 | 2 | 378 | 15,788 | $9,643 | $8,052 | $4,200 | $1,609 | $5,022 | $252 | $11 | | | |
| 518 | PINHOOK | 2000 | MERCURY | 2/3/06 | 3 | 1,039 | 97,988 | $8,436 | $8,805 | $1,436 | $2,753 | $6,210 | $0 | $10 | | | |

FIG. 18E

| SCORE | LOC | Yr | MAKE | MODEL | DEL DATE REPO DATE | Rea | Days | Miles | Prin Bal | Orig ACV | Curr. Acv ($) | DOWN PAY ($) | TOTAL PAY ($) | Warr Ref. ($) | Tot Col | Rep TO Repo | CASH GAIN/ LOSS | BOOK WRITE-OFF |
|---|---|---|---|---|---|---|---|---|---|---|---|---|---|---|---|---|---|---|
| 627 | PINHOOK | 2005 | | GRAND MARQUIS | 12/08/08 | | | | | | | | | | | | | |
| | | | | CHEVROLET MALIBU | 5/2/08 2/16/09 | 2 | 291 | 13,648 | $10,437 | $8,724 | $5,000 | $2,093 | $3,769 | $344 | $11 | | | |
| 594 | PINHOOK | 2000 | ISUZU | TROOPER | 2/7/06 2/2/09 | 1 | 1,091 | 49,634 | $3,564 | $9,805 | $942 | $3,290 | $15,950 | $0 | $26 | | | |
| 565 | PINHOOK | 2003 | DODGE | CARAVAN | 10/2/08 2/20/09 | 2 | 142 | 9,408 | $10,004 | $5,952 | $1,745 | $1,354 | $1,723 | $458 | $5, | | | |
| 576 | PINHOOK | 2001 | NISSAN | MAXIMA | 2/2/07 2/20/09 | 1 | 749 | 32,694 | $7,746 | $9,041 | $2,723 | $2,071 | $10,000 | $0 | $14 | | | |
| 593 | PINHOOK | 1999 | FORD | EXPEDITION | 6/17/06 2/23/09 | 3 | 983 | 50,181 | $7,818 | $10,035 | $1,986 | $2,284 | $11,252 | $0 | $15 | | | |
| 599 | PINHOOK | 1998 | BUICK | PARK AVENUE | 5/17/09 2/4/09 | 5 | 630 | 18,258 | $7,967 | $7,909 | $1,500 | $778 | $8,872 | $69 | $11 | | | |
| 683 | PINHOOK | 2002 | NISSAN | MAXIMA | 9/14/07 2/4/09 | 5 | 510 | 13,276 | $10,518 | $10,100 | $5,500 | $2,308 | $6,135 | $160 | $14 | | | |
| 558 | PINHOOK | 2002 | FORD | F150 | 9/16/08 2/6/09 | 1 | 144 | 9,578 | $13,526 | $8,687 | $6,000 | $1,037 | $1,849 | $435 | $9, | | | |
| 558 | PINHOOK | 2002 | FORD | F150 | 9/16/08 2/6/09 | 1 | 144 | 9,578 | $13,526 | $8,687 | $6,000 | $1,037 | $1,849 | $435 | $9, | | | |
| 581 | PINHOOK | 1995 | MAZDA | MILLENIA | 10/13/05 3/12/09 | 3 | 1,246 | 49,173 | $4,676 | $6,953 | $125 | $2,597 | $9,026 | $0 | $11 | | | |
| 567 | PINHOOK | 2001 | BUICK | REGAL | 2/10/07 3/30/09 | 2 | 779 | 37,500 | $4,755 | $6,535 | $2,305 | $1,585 | $10,365 | $0 | $14 | | | |

FIG. 18F

| SCORE | LOC | Yr | MAKE MODEL | DATE REPO DATE | Rea | Days | Miles | Prin Bal | Orig ACV | Curr. Acv ($) | DOWN PAY ($) | TOTAL PAY ($) | Warr Ref. ($) | Tot Col | Rep TO Repo | CASH GAIN/ LOSS | BOOK WRITE-OFF |
|---|---|---|---|---|---|---|---|---|---|---|---|---|---|---|---|---|---|
| 641 | PINHOOK | 1999 | TOYOTA CAMRY SOLARA | 2/9/07 3/4/09 | 5 | 754 | 45,044 | $5,232 | $7,670 | $2,500 | $1,907 | $11,185 | $0 | $15 | | | |
| 560 | PINHOOK | 2002 | DODGE DURANGO | 4/18/06 4/14/09 | 3 | 1,092 | 75,616 | $6,900 | $6,495 | $2,333 | $2,203 | $9,614 | $0 | $14 | | | |
| 745 | PINHOOK | 2001 | NISSAN PATHFINDER | 2/23/07 4/16/09 | 5 | 783 | 25,943 | $8,491 | $8,999 | $1,907 | $2,213 | $10,679 | $0 | $14 | | | |
| 717 | PINHOOK | 2002 | FORD EXPEDITION | 2/6/08 4/20/09 | 5 | 439 | 33,108 | $9,881 | $9,610 | $4,500 | $2,131 | $6,442 | $229 | $13 | | | |
| 612 | PINHOOK | 2002 | TOYOTA CAMRY | 2/8/08 4/22/09 | 8 | 439 | 33,897 | $8,442 | $8,858 | $3,244 | $2,132 | $6,568 | $229 | $12 | | | |
| 537 | PINHOOK | 2004 | BUICK LESABRE | 1/24/09 4/30/09 | 5 | 96 | 11,552 | $11,545 | $8,659 | $6,000 | $2,032 | $939 | $458 | $9, | | | |
| 488 | PINHOOK | 1999 | FORD CROWN VICTORIA | 8/18/05 4/9/09 | 3 | 1,330 | 32,006 | $2,353 | $5,637 | $2,334 | $2,565 | $9,183 | $0 | $14 | | | |
| 720 | PINHOOK | 2002 | TOYOTA AVALON | 2/12/08 5/13/09 | 2 | 456 | 24,149 | $8,286 | $9,400 | $4,500 | $2,128 | $7,189 | $206 | $14 | | | |
| 743 | PINHOOK | 2003 | FORD EXPLORER SPORT | 11/7/08 5/18/09 | 5 | 192 | 6,995 | $12,883 | $10,304 | $6,500 | $1,916 | $2,507 | $413 | $11 | | | |
| 621 | PINHOOK | 1997 | BMW 7 SERIES | 10/9/08 5/18/09 | 5 | 221 | 16,438 | $11,064 | $7,140 | $2,540 | $909 | $1,925 | $390 | $5, | | | |
| SCORE | LOC | Yr | MAKE MODEL | DEL DATE REPO DATE | Rea | Days | Miles | Prin Bal | Orig ACV | Curr. Acv ($) | DOWN PAY ($) | TOTAL PAY ($) | Warr Ref. ($) | Tot Col | Rep TO Repo | CASH GAIN/ LOSS | BOOK WRITE-OFF |

*FIG. 18G*

| SCORE | LOC | Yr | MAKE | MODEL | REPO DATE | DEL DATE | Rea | Days | Miles | Prin Bal | Orig ACV | Curr. Acv ($) | DOWN PAY ($) | TOTAL PAY ($) | Warr Ref. ($) | Tot Col |
|---|---|---|---|---|---|---|---|---|---|---|---|---|---|---|---|---|
| 713 | PINHOOK | 2002 | FORD | EXPEDITION | 3/3/08 | | 2 | 442 | 14,886 | $8,189 | $9,557 | $4,500 | $2,205 | $4,651 | $229 | $11 |
| 517 | PINHOOK | 1998 | FORD | EXPEDITION | 5/19/09 | | 2 | 238 | 5,072 | $10,302 | $6,283 | $3,000 | $654 | $2,120 | $367 | $6, |
| 557 | PINHOOK | 2001 | BUICK | LESABRE | 9/25/08 5/21/09 | | 5 | 902 | 63,087 | $4,716 | $8,915 | $1,676 | $2,461 | $13,372 | $0 | $12 |
| 580 | PINHOOK | 2001 | VOLVO | S40 | 12/2/06 5/22/09 | | 2 | 548 | 33,578 | $5,342 | $5,920 | $774 | $2,032 | $6,497 | $138 | $9, |
| 562 | PINHOOK | 2003 | PONTIAC | GRAND AM | 11/21/07 5/22/09 | | 5 | 897 | 43,080 | $3,570 | $7,000 | $2,005 | $1,794 | $13,007 | $0 | $16 |
| 619 | PINHOOK | 1998 | TOYOTA | 4RUNNER | 12/11/06 5/26/09 | | 2 | 553 | 28,345 | $8,826 | $9,318 | $3,800 | $2,142 | $6,611 | $138 | $12 |
| 579 | PINHOOK | 2004 | PONTIAC | GRAND PRIX | 11/23/07 5/29/09 | | 2 | 229 | 14,801 | $9,622 | $7,653 | $4,000 | $1,998 | $3,728 | $367 | $10 |
| 585 | PINHOOK | 2001 | DODGE | GRAND CARAVAN | 9/17/08 5/4/09 | | 2 | 759 | 17,327 | $4,210 | $4,455 | $1,445 | $800 | $7,808 | $0 | $10 |
| 576 | PINHOOK | 1996 | FORD | BRONCO | 4/6/07 5/4/09 | | 4 | 927 | 36,581 | $3,563 | $6,244 | $1,755 | $1,421 | $12,134 | $0 | $15 |
| 728 | PINHOOK | 1999 | FORD | EXPLORER | 10/23/06 5/7/09 | | 2 | 175 | -1,512 | $10,143 | $6,205 | $3,000 | $645 | $2,130 | $413 | $6, |
| 575 | PINHOOK | 2001 | BUICK | LESABRE | 11/14/08 5/8/09 | | 1 | 266 | 10,420 | $8,068 | $6,500 | $4,500 | $1,156 | $2,306 | $344 | $8, |
| 567 | PINHOOK | 1997 | FORD | EXPEDITION | 9/21/07 6/13/08 12/26/07 6/16/08 | | 5 | 173 | 7,431 | $10,598 | $8,403 | $4,500 | $1,962 | $2,850 | $413 | $9, |

| SCORE | LOC | Yr | MAKE | MODEL | REPO DATE | DEL DATE | Rea | Days | Miles | Prin Bal | Orig ACV | Curr. Acv ($) | DOWN PAY ($) | TOTAL PAY ($) | Warr Ref. ($) | Tot Col | Rep TO Repo | CASH GAIN/ LOSS | BOOK WRITE-OFF |
|---|---|---|---|---|---|---|---|---|---|---|---|---|---|---|---|---|---|---|---|
| 778 | PINHOOK | 2002 | BUICK | RENDEZVOUS | 4/2/07 | 6/20/08 | 5 | 445 | 25,477 | $9,655 | $9,412 | $4,000 | $2,292 | $6,473 | $229 | $12 | | | |
| 578 | PINHOOK | 1998 | CHRYSLER | CONCORDE | 12/1/07 | 6/20/08 | 1 | 202 | 11,485 | $6,582 | $5,461 | $883 | $2,261 | $831 | $413 | $4, | | | |
| 615 | PINHOOK | 2000 | LINCOLN | TOWN CAR | 8/1/07 | 6/3/08 | 1 | 307 | 14,423 | $11,194 | $8,721 | $6,000 | $1,933 | $3,341 | $321 | $11 | | | |
| 569 | PINHOOK | 2002 | CHRYSLER | PT CRUISER | 12/14/06 | 7/10/08 | 2 | 574 | 18,581 | $6,909 | $9,338 | $5,000 | $3,131 | $9,015 | $115 | $12 | | | |
| 533 | PINHOOK | 1997 | HONDA | ACCORD | 8/31/06 | 7/2/08 | 2 | 671 | 27,954 | $5,563 | $7,309 | $2,207 | $2,184 | $9,969 | $23 | $14 | | | |
| 621 | PINHOOK | 1997 | NISSAN | MAXIMA | 2/1/08 | 7/29/08 | 1 | 179 | 12,743 | $11,470 | $7,486 | $466 | $535 | $2,338 | $435 | $3, | | | |
| 569 | PINHOOK | 1999 | CHRYSLER | 300M | 12/21/06 | 7/30/08 | 5 | 587 | 42,758 | $6,984 | $7,452 | $2,706 | $2,111 | $7,486 | $115 | $12 | | | |
| 628 | PINHOOK | 1999 | FORD | EXPLORTER | 11/11/05 | 7/31/08 | 2 | 993 | 53,384 | $5,144 | $8,830 | $1,376 | $2,763 | $13,107 | $0 | $17 | | | |
| 562 | PINHOOK | 2001 | NISSAN | MAXIMA | 11/15/07 | 7/8/08 | 5 | 236 | 8,877 | $10,270 | $8,898 | $5,300 | $2,203 | $3,955 | $367 | $11 | | | |
| 531 | PINHOOK | 2000 | FORD | EXPEDITION | 10/3/07 | 7/9/08 | 1 | 280 | 16,361 | $10,570 | $8,534 | $4,300 | $2,023 | $2,992 | $344 | $9, | | | |
| 565 | PINHOOK | 2002 | GMC | YUKON | 11/14/07 | 8/7/08 | 5 | 267 | 11,204 | $12,195 | $11,063 | $6,000 | $2,520 | $3,636 | $344 | $12 | | | |
| 547 | PINHOOK | 2001 | FORD | EXPLORER | 9/25/07 | 8/7/08 | 5 | 352 | 17,740 | $8,825 | $7,000 | $884 | $2,284 | $4,330 | $275 | $7, | | | |
| 649 | PINHOOK | 1999 | CHRYSLER | | 11/15/07 | 9/11/08 | 5 | 315 | 23,958 | $9,979 | $7,557 | $925 | $1,809 | $2,964 | $321 | $6, | | | |

| SCORE | LOC | Yr | MAKE MODEL | DEL DATE REPO DATE | Rea | Days | Miles | Prin Bal | Orig ACV | Curr. Acv ($) | DOWN PAY ($) | TOTAL PAY ($) | Warr Ref. ($) | Tot Col | Rep TO Repo | CASH GAIN/ LOSS | BOOK WRITE-OFF |
|---|---|---|---|---|---|---|---|---|---|---|---|---|---|---|---|---|---|
| | | | 300M | 9/25/08 TOTAL: 95 | | 599 | 56,896 30,601 1,533 | 2,907,055 | 762,024 | 776,553 8,174 | 269,765 2,840 | 190,447 2,005 | 666,638 7,017 | 16,340 172 | $1, $1 | | |
| 693 | PINHOOK | 2001 | JEEP GRAND CHEROKEE | 10/15/05 1/9/09 | – | 1,183 | 58,014 | $0 | $8,000 | $0 | $2,656 | $19,048 | $0 | $23 | | | |
| 593 | PINHOOK | 2003 | FORD TAURUS | 4/10/06 10/10/08 | – | 914 | 33,304 | $0 | $7,043 | $0 | $2,251 | $17,473 | $0 | $19 | | | |
| 609 | PINHOOK | 1999 | FORD EXPLORER | 11/4/05 10/10/08 | – | 1,071 | 74,916 | $0 | $7,535 | $0 | $2,501 | $17,507 | $0 | $20 | | | |
| 541 | PINHOOK | 1995 | TOYOTA COROLLA | 8/19/05 10/14/08 | – | 1,152 | 72,645 | $0 | $4,900 | $0 | $1,529 | $14,398 | $0 | $15 | | | |
| 679 | PINHOOK | 1999 | GMC YUKON | 10/31/05 10/17/08 | – | 1,082 | 71,830 | $0 | $9,003 | $0 | $4,777 | $17,423 | $0 | $22 | | | |
| 716 | PINHOOK | 1999 | DODGE RAM PICKUP | 10/31/06 10/21/08 | – | 721 | 36,000 | $0 | $6,858 | $0 | $1,603 | $13,181 | $0 | $14 | | | |
| 640 | PINHOOK | 1997 | CHEVROLET SUBURBAN | 10/17/05 10/24/08 | – | 1,103 | 70,957 | $0 | $8,500 | $0 | $2,581 | $19,005 | $0 | $21 | | | |
| 667 | PINHOOK | 1999 | OLDSMOBILE ALERO | 10/21/05 10/29/08 | – | 1,104 | 54,000 | $0 | $7,864 | $0 | $2,429 | $17,245 | $0 | $19 | | | |
| 635 | PINHOOK | 1999 | MERCURY SABLE | 9/8/05 10/3/08 | – | 1,121 | 35,789 | $0 | $4,259 | $0 | $1,051 | $12,578 | $0 | $13 | | | |
| 595 | PINHOOK | 1998 | FORD | 5/10/06 | – | 905 | 24,000 | $0 | $4,700 | $0 | $1,816 | $14,030 | $0 | $15 | | | |

| SCORE | LOC | Yr | MAKE | MODEL | REPO DATE | Rea | Days | Miles | Prin Bal | Orig ACV | Curr. Acv ($) | DOWN PAY ($) | TOTAL PAY ($) | Warr Ref. ($) | Tot Col | Rep TO Repo | CASH GAIN/ LOSS | BOOK WRITE-OFF |
|---|---|---|---|---|---|---|---|---|---|---|---|---|---|---|---|---|---|---|
| | | | TAURUS | | 10/31/08 DEL DATE | | | | | | | | | | | | | |
| 539 | PINHOOK | 2001 | PONTIAC | GRAND AM | 11/12/05 | – | 1,094 | 33,769 | $0 | $8,702 | $0 | $2,902 | $19,358 | $0 | $27 | | | |
| 663 | PINHOOK | 1997 | HONDA | PRELUDE | 11/10/08 | | | | | | | | | | | | | |
| | | | | | 10/22/05 | – | 1,119 | 39,081 | $0 | $7,586 | $0 | $2,384 | $16,813 | $0 | $15 | | | |
| 679 | PINHOOK | 1999 | FORD | EXPEDITION | 11/13/08 | | | | | | | | | | | | | |
| | | | | | 11/18/05 | – | 1,091 | 78,205 | $0 | $9,802 | $0 | $3,413 | $21,127 | $0 | $24 | | | |
| 563 | PINHOOK | 1999 | FORD | EXPLORER | 11/13/08 | | | | | | | | | | | | | |
| | | | | | 12/17/05 | – | 1,152 | 49,819 | $0 | $9,017 | $0 | $2,528 | $19,264 | $0 | $21 | | | |
| 698 | PINHOOK | 2000 | DAEWOO | LANOS | 2/11/09 | | | | | | | | | | | | | |
| | | | | | 2/14/06 | – | 1,099 | 40,644 | $0 | $4,711 | $0 | $1,818 | $14,373 | $0 | $16 | | | |
| 494 | PINHOOK | 1998 | TOYOTA | COROLLA | 2/17/09 | | | | | | | | | | | | | |
| | | | | | 5/26/05 | – | 1,364 | 66,192 | $0 | $5,500 | $0 | $1,196 | $13,994 | $0 | $15 | | | |
| 554 | PINHOOK | 1995 | GMC | SUBURBAN | 2/17/09 | | | | | | | | | | | | | |
| | | | | | 5/19/06 | – | 1,008 | 49,500 | $0 | $4,608 | $0 | $1,484 | $12,671 | $0 | $14 | | | |
| 659 | PINHOOK | 1999 | CHEVROLET | MALIBU | 2/19/09 | | | | | | | | | | | | | |
| | | | | | 10/8/05 | – | 1,214 | 30,635 | $0 | $5,616 | $0 | $2,026 | $13,471 | $0 | $15 | | | |
| 536 | PINHOOK | 1998 | FORD | EXPEDITION | 2/2/09 | | | | | | | | | | | | | |
| | | | | | 12/28/05 | – | 1,135 | 41,644 | $0 | $9,865 | $0 | $2,905 | $21,012 | $0 | $23 | | | |
| 526 | PINHOOK | 1998 | FORD | EXPEDITION | 2/5/09 | | | | | | | | | | | | | |
| | | | | | 12/28/05 | – | 1,135 | 55,500 | $0 | $9,865 | $0 | $2,905 | $21,021 | $0 | $23 | | | |

| SCORE | LOC | Yr | MAKE | MODEL | DEL DATE REPO DATE | Rea | Days | Miles | Prin Bal | Orig ACV | Curr. Acv ($) | DOWN PAY ($) | TOTAL PAY ($) | Warr Ref. ($) | Tot Col |
|---|---|---|---|---|---|---|---|---|---|---|---|---|---|---|---|
| 582 | PINHOOK | 2001 | | DAEWOO | 2/27/06 | – | 1,075 | 52,720 | $0 | $6,259 | $0 | $2,083 | $14,929 | $0 | $17 |

FIG. 18L

| SCORE | LOC | Yr | MAKE | MODEL | REPO DATE | DEL DATE | Rea Days | Miles | Prin Bal | Orig ACV | Curr. Acv ($) | DOWN PAY ($) | TOTAL PAY ($) | Warr Ref. ($) | Tot Col | Rep TO Repo | CASH GAIN/ LOSS | BOOK WRITE-OFF |
|---|---|---|---|---|---|---|---|---|---|---|---|---|---|---|---|---|---|---|
| 644 | PINHOOK | 1999 | | LEGANZA | | 2/6/09 | — | | | | | | | $0 | $24 | | | |
| 592 | PINHOOK | 1999 | FORD | EXPEDITION | 1/24/06 | 2/6/09 | — | 1,109 | 21,873 | $0 | $10,426 | $0 | $3,055 | $21,039 | $0 | $19 | | |
| 635 | PINHOOK | 1999 | OLDSMOBILE | INTRIGUE | 12/13/05 | 2/6/09 | — | 1,151 | 9,349 | $0 | $7,102 | $0 | $2,253 | $17,294 | $0 | $21 | | |
| 730 | PINHOOK | 2001 | CHEVROLET | TAHOE | 1/26/06 | 3/13/09 | — | 1,142 | 37,151 | $0 | $8,922 | $0 | $2,433 | $18,629 | $0 | $21 | | |
| 506 | PINHOOK | 1999 | CHEVROLET | IMPALA | 2/15/06 | 3/20/09 | — | 1,129 | 69,630 | $0 | $8,506 | $0 | $3,768 | $18,067 | $0 | $22 | | |
| 640 | PINHOOK | 2001 | DODGE | DURANGO | 12/9/05 | 3/20/09 | — | 1,197 | 43,019 | $0 | $8,578 | $0 | $2,647 | $19,719 | $0 | $20 | | |
| 550 | PINHOOK | 2001 | CHRYSLER | SEBRING | 4/21/06 | 3/30/09 | — | 1,074 | 33,157 | $0 | $7,587 | $0 | $2,364 | $18,443 | $0 | $19 | | |
| 694 | PINHOOK | 2000 | OLDSMOBILE | AURORA | 8/18/06 | 3/5/09 | — | 931 | 36,373 | $0 | $8,943 | $0 | $2,089 | $17,819 | $0 | $21 | | |
| 562 | PINHOOK | 2003 | CHRYSLER | CONCORDE | 3/20/06 | 3/6/09 | — | 1,082 | 43,278 | $0 | $8,400 | $0 | $2,575 | $19,413 | $0 | $20 | | |
| | | | MERCURY | SABLE | 3/13/06 | 3/9/09 | — | 1,092 | 55,537 | $0 | $7,500 | $0 | $2,344 | $18,019 | $0 | | | |
| 735 | PINHOOK | 1999 | DAEWOO | LEGANZA | 5/15/06 | 4/22/09 | — | 1,073 | 30,415 | $0 | $5,430 | $0 | $1,799 | $15,646 | $0 | $17 | | |
| 690 | PINHOOK | 2001 | FORD | EXPEDITION | 2/18/06 | 4/27/09 | — | 1,164 | 94,331 | $0 | $11,429 | $0 | $3,291 | $22,172 | $0 | $25 | | |
| 584 | PINHOOK | 2001 | OLDSMOBILE | ALERO | 3/6/07 | 5/28/09 | — | 814 | 36,000 | $0 | $6,103 | $0 | $861 | $9,819 | $0 | $10 | | |

| SCORE | LOC | Yr | MAKE | MODEL | REPO DATE | DEL DATE | Rea Days | Miles | Prin Bal | Orig ACV | Curr. Acv ($) | DOWN PAY ($) | TOTAL PAY ($) | Warr Ref. ($) | Tot Col | Rep TO Repo | CASH GAIN/ LOSS | BOOK WRITE-OFF |
|---|---|---|---|---|---|---|---|---|---|---|---|---|---|---|---|---|---|---|
| 654 | PINHOOK | 2002 | FORD | FOCUS | 5/15/06 | — | 1,110 | 92,353 | $0 | $6,591 | $0 | $2,129 | $17,248 | $0 | $19 | | | |
| 649 | PINHOOK | 2000 | FORD | EXPEDITION | 5/29/09 11/14/05 6/11/08 | — | 940 | -76,974 | $0 | $9,990 | $0 | $2,277 | $21,135 | $0 | $23 | | | |
| 628 | PINHOOK | 1999 | FORD | MUSTANG | 4/29/05 6/13/08 | — | 1,141 | 48,600 | $0 | $6,514 | $0 | $2,317 | $14,269 | $0 | $16 | | | |
| 560 | PINHOOK | 2000 | CHRYSLER | TOWN & COUNTRY | 5/15/05 6/30/08 | — | 1,142 | 54,551 | $0 | $9,102 | $0 | $3,630 | $14,434 | $0 | $18 | | | |
| 593 | PINHOOK | 1998 | FORD | MUSTANG | 6/21/05 7/10/08 | — | 1,115 | 12,729 | $0 | $5,490 | $0 | $1,204 | $15,267 | $0 | $16 | | | |
| 603 | PINHOOK | 2001 | DAEWOO | LEGANZA | 8/8/05 7/11/08 | — | 1,068 | 56,662 | $0 | $4,901 | $0 | $1,821 | $13,984 | $0 | $15 | | | |
| 719 | PINHOOK | 2002 | CHEVROLET | CAVALIER | 7/2/05 7/17/08 | — | 1,111 | 91,414 | $0 | $6,831 | $0 | $2,037 | $16,652 | $0 | $18 | | | |
| 705 | PINHOOK | 2002 | CHEVROLET | MONTE CARLO | 11/2/06 7/21/08 | — | 627 | 31,500 | | $7,251 | | $1,644 | $15,500 | $69 | $17 | | | |
| 529 | PINHOOK | 1997 | OLDSMOBILE | EIGHTY EIGHT | 12/17/05 7/7/08 | — | 933 | 93,501 | | $6,676 | | $3,067 | $14,301 | $0 | $12 | | | |
| 679 | PINHOOK | 1998 | FORD | WINDSTAR | 8/17/05 8/15/08 | — | 1,094 | 99,620 | | $5,090 | | $1,122 | $13,862 | $0 | $14 | | | |
| 557 | PINHOOK | 1999 | JEEP | GRAND CHEROKEE | 8/22/05 8/25/08 | — | 1,099 | 77,789 | | $7,944 | | $2,377 | $17,386 | $0 | $19 | | | |
| 523 | PINHOOK | 2002 | CHEVROLET | | 12/22/05 | — | 979 | 48,000 | | $8,660 | | $2,611 | $18,609 | $0 | $21 | | | |

FIG. 18M

| SCORE | LOC | Yr | MAKE | MODEL | REPO DATE | DEL DATE | Rea | Days | Miles | Prin Bal | Orig ACV | Curr. Acv ($) | DOWN PAY ($) | TOTAL PAY ($) | Warr Ref. ($) | Tot Col | Rep TO Repo | CASH GAIN/ LOSS | BOOK WRITE-OFF |
|---|---|---|---|---|---|---|---|---|---|---|---|---|---|---|---|---|---|---|---|
| 751 | PINHOOK | 2000 |  | MALIBU | 8/27/08 |  |  |  |  |  |  |  |  |  |  |  |  |  |  |
| 678 | PINHOOK | 1998 | OLDSMOBILE | ALERO | 9/13/05 | 9/29/08 | – | 1,112 | 66,905 | $0 | $5,985 | $0 | $2,000 | $15,667 | $0 | $12 |  |  |  |
| 581 | PINHOOK | 2001 | FORD | EXPEDITION | 11/8/05 | 9/29/08 | – | 1,056 | 37,470 | $0 | $10,731 | $0 | $2,988 | $20,247 | $0 | $23 |  |  |  |
| 643 | PINHOOK | 1998 | CHRYSLER | PT CRUISER | 12/28/06 | 9/5/08 | – | 617 | 31,500 | $0 | $6,766 | $0 | $1,724 | $14,000 | $46 | $15 |  |  |  |
|  |  |  | FORD | F150 | 9/8/05 | 9/9/08 | – | 1,097 | 228,565 | $0 | $7,886 | $0 | $2,403 | $17,312 | $0 | $19 |  |  |  |
| TOTAL: 49 |  |  |  |  |  |  |  | 52,041 1,062 1,484 | 2,573,462 52,520 | $0 $0 |  | $365,328 $7,456 | $0 $0 | $114,169 $2,330 | $825,870 $16,854 | $115 $2 | $9 $1 |  |  |  |
| 629 | PINHOOK | 2000 | ACURA | INTEGRA | 7/15/08 |  | – | 191 | 9,000 | $6,593 | $6,000 | $0 | $1,153 | $6,418 | $413 | $7, |  |  |  |
| 603 | PINHOOK | 2002 | BUICK | RENDEZVOUS | 1/19/07 | 1/21/09 | – | 733 | 36,000 | $5,948 | $9,478 | $0 | $2,191 | $14,099 | $0 | $16 |  |  |  |
| 605 | PINHOOK | 2001 | PONTIAC | BONNEVILLE | 3/12/08 | 10/21/08 | – | 223 | 10,500 | $3,139 | $5,632 | $0 | $1,856 | $11,957 | $390 | $14 |  |  |  |
| 732 | PINHOOK | 1999 | JEEP | GRAND CHEROKEE | 1/2/08 | 10/21/08 | – | 293 | 13,500 | $4,591 | $7,697 | $7,697 | $2,321 | $10,893 | $344 | $21 |  |  |  |
| 622 | PINHOOK | 1998 | LINCOLN | TOWN CAR | 11/7/05 | 10/21/08 | – | 1,079 | 13,500 | $767 | $9,611 | $0 | $2,894 | $20,335 | $0 | $23 |  |  |  |
| 621 | PINHOOK | 1999 | MITSUBISHI |  | 6/5/07 |  | – | 623 | 30,000 | $6,549 | $7,163 | $0 | $1,092 | $9,317 | $92 | $10 |  |  |  |

FIG. 18N

| SCORE | LOC | Yr | MAKE MODEL | REPO DATE | Rea Days | Miles | Prin Bal | Orig ACV | Curr. Acv ($) | DOWN PAY ($) | TOTAL PAY ($) | Warr Ref. ($) | Tot Col | Rep TO Repo | CASH GAIN/ LOSS | BOOK WRITE-OFF |
|---|---|---|---|---|---|---|---|---|---|---|---|---|---|---|---|---|
| 562 | PINHOOK | 2001 | MONTERO SPORT | 2/16/09 | | | | | | | | | | | | |
| 590 | PINHOOK | 1995 | KIA SPORTAGE | 1/2/07 | — 815 | 47,730 | $1,493 | $8,499 | $0 | $2,873 | $17,003 | $0 | $19 | | | |
| 638 | PINHOOK | 1999 | BUICK LESABRE | 3/27/09 | — 1,103 | 54,000 | $1,593 | $6,000 | $0 | $2,028 | $15,339 | $0 | $17 | | | |
| 665 | PINHOOK | 2000 | FORD EXPEDITION | 3/24/06 | — 84 | 4,500 | $6,582 | $6,512 | $0 | $1,545 | $4,295 | $481 | $6, | | | |
| | | | JEEP GRAND CHEROKEE | 3/31/09 | — 105 | 4,500 | $7,413 | $6,633 | $0 | $676 | $6,383 | $481 | $7, | | | |
| | | | | 12/11/08 | | | | | | | | | | | | |
| | | | | 3/5/09 | | | | | | | | | | | | |
| | | | | 2/2/09 | | | | | | | | | | | | |
| | | | | 5/18/09 | | | | | | | | | | | | |
| SCORE | LOC | Yr | MAKE MODEL | DEL DATE REPO DATE | Rea Days | Miles | Prin Bal | Orig ACV | Curr. Acv ($) | DOWN PAY ($) | TOTAL PAY ($) | Warr Ref. ($) | Tot Col | Rep TO Repo | CASH GAIN/ LOSS | BOOK WRITE-OFF |
| 613 | PINHOOK | 2003 | PONTIAC SUNFIRE | 3/3/08 | — 98 | 2,955 | $5,392 | $6,820 | $0 | $1,619 | $8,828 | $481 | $10 | | | |
| 641 | PINHOOK | 2001 | DODGE STRATUS | 6/9/08 | — 845 | 31,500 | $3,232 | $8,003 | $0 | $2,397 | $15,823 | $0 | $18 | | | |
| 642 | PINHOOK | 1998 | LINCOLN TOWN CAR | 5/5/06 | — 1,051 | 38,121 | $767 | $9,611 | $0 | $2,894 | $20,335 | $0 | $23 | | | |
| 648 | PINHOOK | 2001 | DODGE STRATUS | 8/27/08 | — 878 | 42,000 | $3,232 | $8,003 | $0 | $2,397 | $15,823 | $0 | $18 | | | |
| | | | | 11/7/05 | | | | | | | | | | | | |
| | | | | 9/23/08 | | | | | | | | | | | | |
| | | | | 5/5/06 | | | | | | | | | | | | |
| | | | | 9/29/08 | | | | | | | | | | | | |
| TOTAL: 14 | | | | | 8,121 580 | 337,806 24,129 1,248 | $57,292 $4,092 | $105,661 $7,547 | $7,697 $550 | $27,937 $1,995 | $176,848 $12,632 | $2,681 $192 | $2 $1 | | | | |

FIG. 180

| SCORE | LOC | Yr | MODEL | REPO DATE | Req | Days | Miles | Prin Bal | Orig ACV | Curr. Acv ($) | DOWN PAY ($) | TOTAL PAY ($) | Warr Ref. ($) | Tot Col | Rep TO Repo | CASH GAIN/ LOSS | BOOK WRITE-OFF |
|---|---|---|---|---|---|---|---|---|---|---|---|---|---|---|---|---|---|
| 548 | PINHOOK | 1997 | TOYOTA AVALON | 7/20/06 11/30/08 | – | 865 | 42,000 | $4,384 | $5,248 | $0 | $947 | $9,526 | $0 | $10 | | | |
| 564 | PINHOOK | 2000 | JEEP GRAND CHEROKEE | 1/31/08 12/23/08 | – | 327 | 16,950 | $2,818 | $7,892 | $0 | $1,754 | $14,750 | $298 | $16 | | | |
| 588 | PINHOOK | 1998 | PONTIAC BONNEVILLE | 9/14/06 8/21/08 | – | 707 | 34,500 | $2,722 | $3,326 | $0 | $857 | $6,764 | $23 | $7, | | | |
| 582 | PINHOOK | 2000 | MITSUBISHI ECLISPE | 1/19/07 8/5/08 | – | 564 | 27,000 | $3,298 | $6,483 | $0 | $1,905 | $12,074 | $115 | $14 | | | |
| 590 | PINHOOK | 2004 | NISSAN ALTIMA | 1/3/08 9/30/08 | – | 271 | 12,000 | $11,543 | $9,133 | $0 | $2,237 | $2,343 | $367 | $4, | | | |
| 553 | PINHOOK | 1999 | FORD EXPEDITION | 8/11/07 9/30/08 | – | 416 | 19,500 | $9,587 | $8,277 | $0 | $1,631 | $5,121 | $252 | $7, | | | |
| 585 | PINHOOK | 1995 | CADILLAC DEVILLE | 4/1/06 9/30/08 | – | 913 | 43,500 | $1,037 | $3,808 | $0 | $1,824 | $966 | $0 | $2, | | | |
| 667 | PINHOOK | 1999 | FORD EXPEDITION | 6/17/06 9/30/08 | – | 836 | 40,500 | $7,818 | $10,035 | $0 | $2,284 | $11,252 | $0 | $13 | | | |
| TOTAL- 8 | | | | | | 4,899 612 | 235,950 29,494 1,446 | $43,206 $5,401 | $54,202 $6,775 | $0 $0 | $13,429 $1,679 | $62,796 $7,849 | $1,054 $132 | $7 $9, | | | |

EXPORT — 20

THIS PAGE LOADED IN 1.90286 SECONDS.

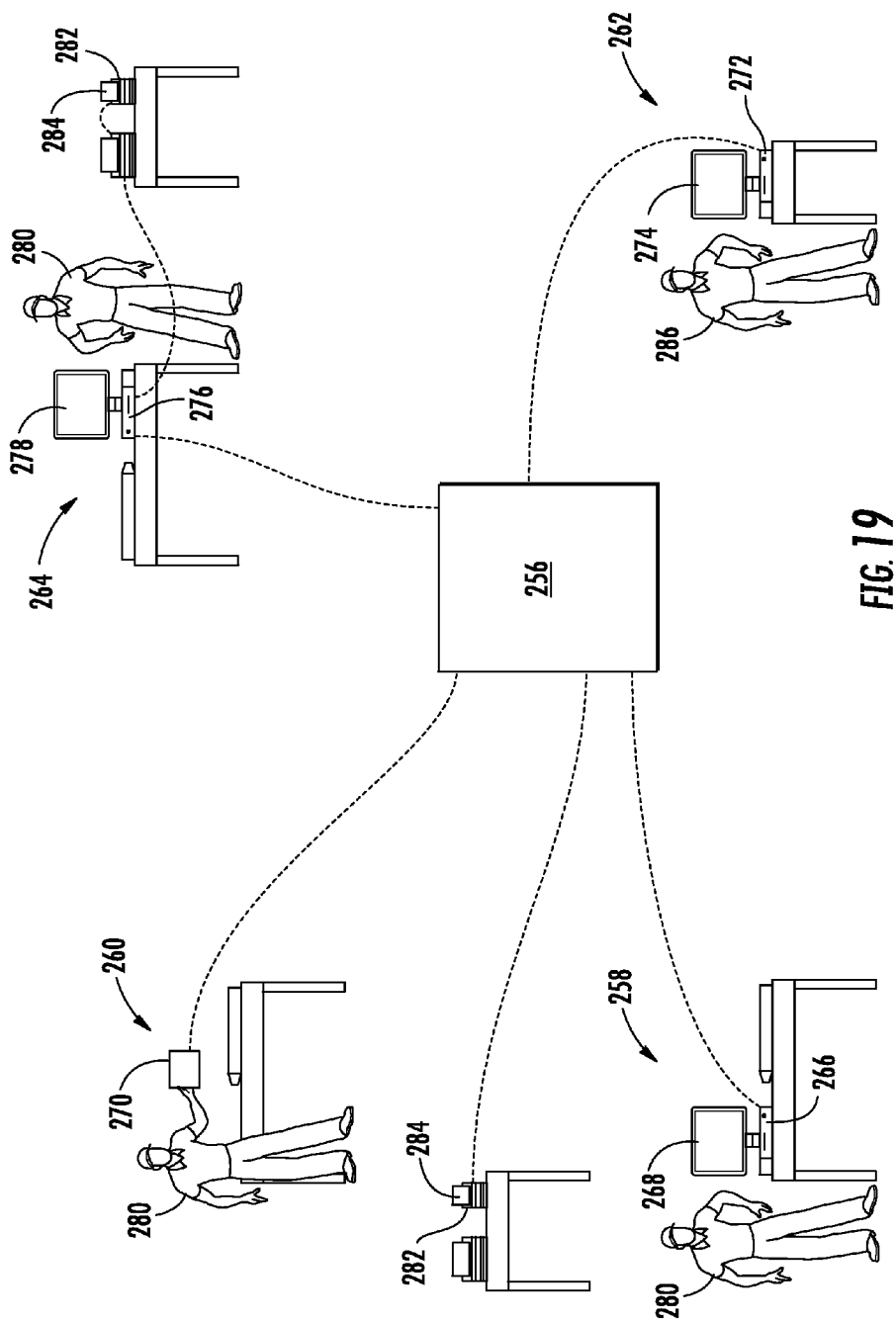

METHOD OF DETERMINING CREDIT WORTHINESS AND PROFITABILITY

CROSS-REFERENCE TO RELATED APPLICATIONS

This application claims the benefit of and priority to U.S. Provisional Patent Application No. 61/229,552, filed Jul. 29, 2009.

FIELD OF THE INVENTION

The present invention relates to a method of determining credit worthiness and profitability and more particularly to a web-based computerized method of determining credit worthiness of vehicle purchasers and profitability of vehicle dealerships.

BACKGROUND OF THE INVENTION

Persons buying vehicles on credit from traditional car dealers have the option of securing an auto loan from direct lenders such as banks, credit unions, or manufacturer-finance companies. Direct lenders typically have stringent underwriting guidelines and lend only to purchasers with fair to excellent credit. Purchasers not able to qualify for traditional auto loans from direct lenders now have the option of buying vehicles from "buy-here pay-here" dealers.

Buy-here pay-here dealers buy vehicles and resell them on their lots. The dealers provide their own re-sale financing to prospective retail purchasers thereby eliminating the need for a direct lender. The dealers' financing arrangements may include payments made in installments to the dealer. Many dealers require check, cash, or money order payments be made in-person.

Because buy-here pay-here dealers finance the sale of their vehicles, they assume the risk that the purchaser will default on his or her loan obligations. It is therefore important to the dealers to evaluate the credit worthiness of the prospective purchaser to determine if the risk of default is reasonably acceptable such that a loan will be made and if so, the amount of money the dealer is willing to loan. An evaluation of a prospective purchaser's credit worthiness will also give the dealer an idea of what type of vehicle (e.g., model, make, year and condition) the purchaser can afford and how to structure the financing and down payment.

The credit worthiness of a potential purchaser may be determined by the person's credit score. The credit score is a number based on a statistical analysis of the person's credit files and in theory represents the likelihood that the person will pay his or her bills. Credit scores are often based on credit report information from the three major credit bureaus: Experian, TransUnion, and Equifax. Income is not considered by the major credit bureaus. Credit scores may be calculated using different methods. The most well known and widely used type of credit score is FICO developed by Fair Isaac Corporation. FICO credit scores ranges between 300 and 850. A lower credit score indicates a greater risk that the borrower may default on his or her financial obligations to the lender. A higher credit score means there is less risk that the borrower will default. Each of the major credit bureaus has its own credit scores.

There is a need among buy-here pay-here dealers and other more traditional car dealers for a credit survey designed to report the credit score of prospective purchasers that will enable the dealers to determine the risk of default associated with lending the purchasers money to cover the sale of the dealers' vehicles and to enable the dealers to structure the financing and down payment to ensure a reasonable opportunity for profitability. There is also a need among dealers for tracking the profitability of their sales and financing transactions.

SUMMARY OF THE INVENTION

It is an object of the present invention to provide a method for determining the credit worthiness of a prospective purchaser buying a vehicle.

It is a further object of the present invention to track the profitability of vehicle sales and financing transactions.

These and other objects and advantages are achieved by the novel method of determining credit worthiness and profitability described herein. The method includes logging into a computer program that contains a credit survey. The method includes conducting the credit survey by inputting prospective purchaser information into the program. The method further includes generating a credit score and using the credit score to decide whether to loan money to the purchaser that will be used to buy the vehicle. The method may further include determining the terms of the vehicle sale and financing such as the amount of money the dealer will loan to the purchaser, the amount of down payment required, and the make, model, year, and condition of the vehicle to be sold to the purchaser. The method may also include inputting information about the sales and financing transactions into a database of the program. The method may further include generating a report based on the transactional information. The method may also include an evaluation of the report to determine the profitability of the transactions such as vehicle sales and financing.

The present invention may include a method of determining credit worthiness of a new customer for financing transactions and profitability of the financing transactions of a business. The method may include providing a computer program stored on a computer storage device that is operatively connected to a display and an input device. The computer program may generate a customer information screen on the display. The computer program may include a database of data from a plurality of customers of the business. The data in the database may include credit information about the customers and a plurality of customer data entries.

The method may also include logging into the computer program using the input device and viewing the customer information screen on the display. The method may further include inputting a customer data set about the new customer into the customer information screen using the input device and inputting a financing data set about a proposed financing transaction with the new customer into the customer information screen using the input device. The customer data set may include information about the new customer's credit worthiness. The financing data set may include information about the terms of the proposed financing transaction.

The computer program may generate a credit score based on the customer data set and the financing data set, and the credit score may be displayed on the customer information screen on the display. The customer data set, the financing data set, and the credit score of the new customer may be stored as a new customer data entry in the database on the computer storage device. The step of generating the credit score may involve generating a stability score based on the customer data set, generating a deal score based on the financing data set, and generating the credit score based on the stability score and the deal score.

The customer information screen may include a plurality of customer questions and a mechanism for selecting one or more answers of the new customer from a plurality of available answers to each of the plurality of customer questions. The customer data set may include selections from the plurality of available answers to each of the plurality of customer questions. The plurality of customer questions on the customer information screen may include a set of residence questions, a set of employment questions, and a set of credit questions. The set of residence questions may include a residence status, a time in residence, a number of recent residence changes, and a time in area. The set of employment questions may include a length of employment, a number of recent changes in employment, a number of employment lapses, and a gross monthly income. The set of credit questions may include a number of positive auto credits, a number of repossessions, a time in a credit bureau, and a credit bureau score. The customer information screen may also include a mechanism for inputting identifying information about the new customer. The identifying information may also be included in the customer data set. The identifying information may include a name, an age, a business location, and a zip code.

The customer information screen may also include a plurality of financing questions and a mechanism for selecting one or more answers of the proposed financing transaction from a plurality of available answers to each of the plurality of financing questions. The financing data set may include selections from the plurality of available answers to each of the plurality of financing questions. The plurality of financing questions on the customer information screen may include a set of product questions and a set of financial questions. The set of product questions may include a product type and a product condition. If the proposed financing transaction is a proposed motor vehicle loan, the product type may include a make and a model, and the product condition may include a mileage amount. The set of financial questions may include a sales price, a down payment amount, a comparison of the down payment amount and a cost, and a comparison of the down payment amount and an expendable income amount for the new customer.

The method may further include evaluating the credit score and deciding whether to extend a financing transaction offer to the new customer based on the evaluation of the credit score. The computer program may also generate a declined screen on the display. If the decision is to not extend the financing transaction offer, the method may further include navigating to the declined screen within the computer program using the input device, viewing the declined screen on the display, and inputting a declined data set about the new customer into the declined screen using the input device. The declined data set may include information about the decision not to extend the financing transaction offer to the new customer.

The declined screen may include a mechanism for selecting one or more reasons for the decision not to extend the financing transaction offer to the new customer from a plurality of available reasons. The declined data set may be input by selecting from the plurality of available reasons. The plurality of available reasons may include incomplete credit application, temporary residence, insufficient number of credit references, inability to verify residence, unacceptable type of credit references, insufficient income for amount of credit, delinquent credit obligations, excessive obligations in relation to income, collection of other debts, no credit file, inability to verify credit references, limited credit experience, length of employment, poor credit, inability to verify income, bankruptcy, length of residence, insufficient collateral, or inadequate down payment.

The computer program may also generate a disposition screen on the display. The method may further include navigating to the disposition screen within the computer program using the input device, viewing the disposition screen on the display, and finding and selecting a chosen customer data entry from the plurality of customer data entries stored in the database on the disposition screen using the input device. The method may further include inputting a disposition data set for the chosen customer data entry into the disposition screen using the input device and storing the disposition data set with the chosen customer data entry in the database on the computer storage device. The disposition data set may include a disposition status for a financing transaction for the chosen customer data entry.

The disposition status for the chosen customer data entry may be selected from a plurality of available disposition statuses. The plurality of available disposition statuses may include insurance loss, repossession, paid, and charge off. The disposition data set may also include identifying information about a purchased product, information about a current condition of the purchased product, and information about the financing transaction for the chosen customer data entry. If repossession is selected as the disposition status, the disposition data set may further include information about a reason for repossession.

The computer program may also generate an analysis screen on the display. The method may further include navigating to the analysis screen within the computer program using the input device, viewing the analysis screen on the display, generating a profitability report containing a profitability data set on an analysis set of customer data entries, and viewing the profitability report on the analysis screen on the display. The method may further include evaluating the profitability report and deciding whether to extend a financing transaction offer to a second new customer for a second proposed financing transaction based on the evaluation of the profitability report. The profitability data set in the profitability report may include the customer data set, the financing data set, and the disposition data set. The analysis set of customer data entries may be selected from the plurality of customer data entries stored in the database using a search mechanism on the analysis screen.

The computer storage device, the display, and the input device may be part of a handheld computer device. The computer storage device may include a hard drive. The display may include a computer screen, a television screen, or a handheld display screen. The input device may include a keyboard, a mouse, or a joystick. The display and the input device may be part of a touch-screen device. The computer storage device may include a server operatively connected to a hard drive, the input device, and the display. The hard drive, the input device, and the display may be located remotely from the server. The server may be operatively connected to a plurality of workstations. Each workstation may have a hard drive, an input device, and a display. One or more of the plurality of workstations may be positioned in a different building than the server.

BRIEF DESCRIPTION OF THE DRAWINGS

FIGS. 3A-3D is an embodiment of an add/edit score sheet screen of the program.

FIG. 5 is an embodiment of an insurance loss candidate screen of the program.

FIG. 6 is an embodiment of an insurance loss form screen of the program.

FIG. 7 is an embodiment of an add new repossession screen of the program.

FIGS. 8A-8B is an embodiment of an add/edit repossession form screen of the program.

FIG. 9 is an embodiment of a paid candidates screen of the program.

FIG. 10 is an embodiment of a paid form screen of the program.

FIG. 11 is an embodiment of a charge candidates screen of the program.

FIG. 12 is an embodiment of a charge form screen of the program.

FIG. 13 is an embodiment of a declined forms screen of the program.

FIGS. 14A-14B is an embodiment of an add/edit decline form screen of the program.

FIGS. 18A-18P an embodiment of an underwriting or repossessions report screen of the program.

FIG. 18Q is an embodiment of a partial underwriting or repossession report screen of the program.

FIG. 19 is a schematic diagram of the hardware used as part of the method of the present invention.

DETAILED DESCRIPTION OF THE PREFERRED EMBODIMENTS

The description of the embodiment of the present invention makes reference to a method of using a computer program and computer equipment to determine credit worthiness of prospective purchasers of vehicles owned and being sold by a dealership providing vehicle financing (i.e., a buy-here pay-here dealer) and to determine profitability of the dealer's transactions and financing. It is to be understood that the method and program may be used to determine credit worthiness of prospective purchasers of other products and services and to determine the profitability of sales and financing transactions of other commercial operations and businesses. With reference to the figures where like elements have been given like numerical designation to facilitate an understanding of the invention, and with reference to FIG. 1, the method of the present invention uses a computer program, system, or application that may contain entry screen 10. For purposes hereof, the term computer program, system or application are used interchangeably. Screen 10 serves as the entry point to the computer program and may be displayed on a PC, laptop, or other hand-held device. Screen 10 is the initial screen shown when the program is launched.

Figure 1:
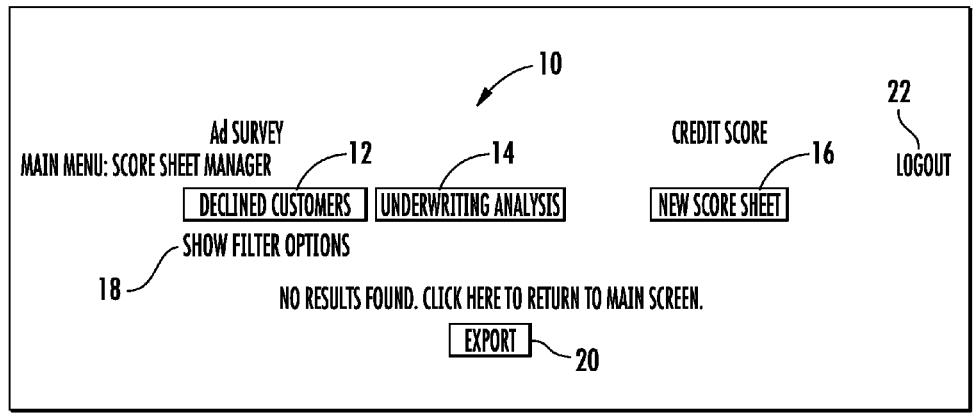
FIG. 1 is an embodiment of an entry screen for the computer program of the present invention.

Again with reference to FIG. 1, entry screen 10 includes declined customers button 12, underwriting analysis button 14, new score sheet button 16, show filter options link 18, export button 20 and logout link 22. Link 18 is hiding the filter or search means which will be explained herein. By clicking on link 18, the filter or search means will be revealed. Export button 20, when activated by clicking thereon, will export any results shown (none are shown in FIG. 1) to another program format such as Excel. Logout link 22 may be clicked on to logout out of the program. Export button 20 and logout link 22 may be provided on other screens of the program and will function in the same way. Button 16 is activated to input customer information into the database of the program to generate a customer credit score. When button 16 is activated, add/edit customer information screen 24 is displayed as shown in FIG. 2.

Figure 2:
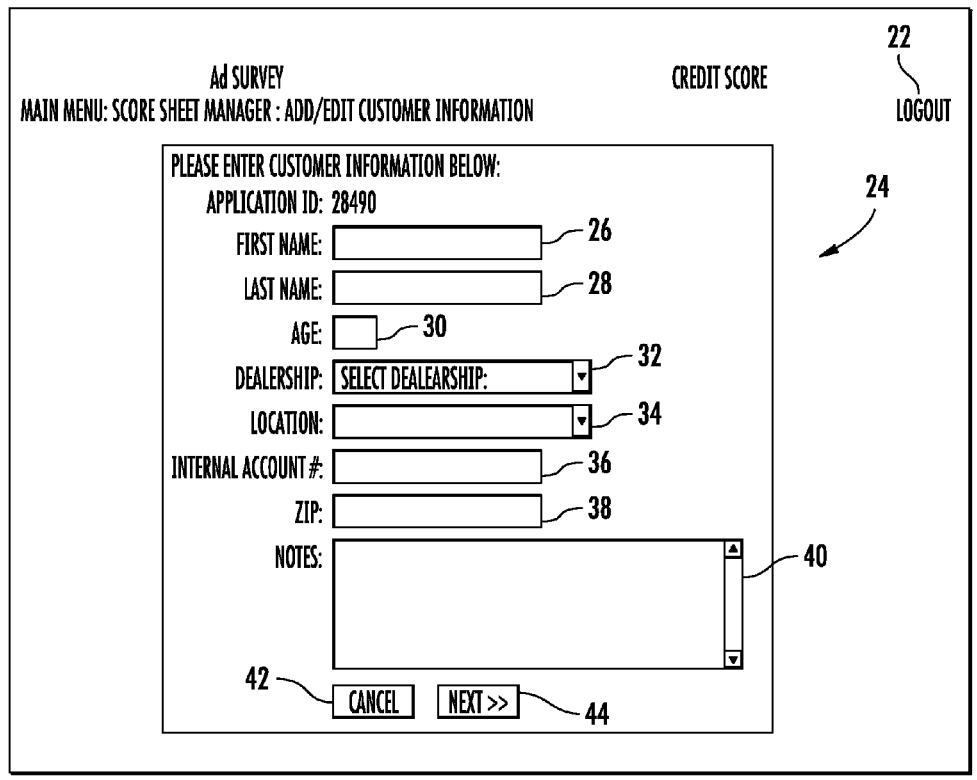
FIG. 2 is an embodiment of an adding/editing customer information screen of the program.

With reference to FIG. 2, screen 24 provides a first template for general customer information to be inputted into the database. The customer's first name is inputted into first name text box 26. The customer's last name is inputted into last name text box 28. The customer's age is inputted into age text box 30. The identity of the dealership where the customer wishes to purchase a vehicle is selected from dealership drop-down menu box 32. The identity of the dealership location is selected from the location drop-down menu box 34. If an internal account number has been assigned for the customer or the transaction, the account number is inputted into internal account text box 36. The internal account number is used to identify and track the entry. The customer's residence zip code is inputted into zip text box 38. Any comments or notes the user of the program desires to input about the customer may be inputted into notes text box 40. The customer information inputted into the program using screen 24 may be undertaken by users such as employees of the dealership (e.g., sales personnel). If the user wishes to cancel the customer information, cancel button 42 may be activated. If the user desires to continue inputting information to generate the customer's credit score, the user activates next button 44.

FIGS. 3A-3D illustrate add/edit score sheet screen 48 which is displayed when the user activates next button 44. Screen 48 displays the name of the customer and the internal account number previously inputted into the program. The user is identified by selecting specific users from scored by drop-down menu box 50. The program may be pre-programmed with the names of the users, e.g., sales personnel employed by the dealer. The current date and time the screen information is shown in status date box 52. Edit customer button 54 may be activated to access previous screen 24 containing the customer name and other information so that changes can be made. Print sheet button 56 may be activated if the user desires to print score sheet 48. To complete score sheet 48, the user queries the customer about his or her current residence status and based on the response selects one of selections lives w/others 58, lives w/parents 60, renting 62, leasing 64 and own 66. The program may contain a help application which displays a bubble containing information about what is meant by selections w/others 58, lives w/parents 60, renting 62, leasing 64 and own 66. The bubble is displayed on screen 48 when, for example, a screen cursor is placed on the residence status selections. The bubble text may define the selection lives w/others 58 as meaning no set financing obligation—just staying at address. The bubble text may define the selection lives w/parents 60 as meaning living with parents regardless of age. The bubble text may define the selection renting 62 as meaning month to month with no long term financing obligation. The bubble text may define the selection leasing 64 as meaning a written term obligation, e.g., an apartment lease. The bubble text may define the selection own 66 as meaning paid off or buying on terms or mortgage. The bubble text may indicate that if renting, leasing or payment seriously overdue—designate as lives w/others 58.

The user next queries the customer about the amount of time he or she has lived at the residence and based on the response selects one of selections 0-6 months 68, 7-12 months 70, 13-35 months 72, 3-5 years 74 and 5+ years 76. The bubble text for this selection may define the selection as meaning the length of time at current full time residence.

The user next asks the customer about how many times he or she changed residences in the last two years and based on the response selects one of selections 4 78, 3 80, 2 82, 1 84 and 0 86. The bubble text for this selection may define the selection as meaning the number of times permanent residence status has changed in the past two years.

The user then questions the customer about how much time he or she has spent in the area of the dealership location and based on the reply selects one of selections 0-12 months 88, 13-59 months 90, 5-10 years 92, 11-25 years 94 and 25+ years 96. The bubble text for the selection may define the selection as meaning length of time customer has lived within 50 mile radius of current full-time residence.

The user next queries the customer about the amount of time he or she has been employed in the customer's current job and based on the answer selects one of selections 0-6 months 98, 7-12 months 100, 12-25 months 102, 3-5 years 104 and 5+ years 106. The bubble text for the selection may define the selection as meaning the length of time at current full-time employment (if previous job time was greater than or equal to 24 months with improved income at new job, combine last job time with new job time when selecting range).

The user then inquiries of the customer the number of times he or she has changed employment in the last two years and based on the answer selects one of selections 4 108, 3 110, 2 112, 1 114 and 0 115. The bubble text for the selection may define the selection as meaning the number of employment changes in the last two years.

The user queries the customer about the number of employment lapses and based on the response selects one of selections 4 116, 3 118, 2 120, 1 122, and 0 124. The bubble text for this selection may define the selection as meaning the total number of times customer was laid off or unemployed for more than 30 days in the last two years.

The user then asks the customer about the amount of his or her gross monthly income and based on the reply selects one of selections $600-$1,499 126, $1,500-$1,999 128, $2,000-$2,499 130, $2,500-$2,999 132 and $3,000+ 134. The bubble text for the selection may define the selection as meaning full time monthly gross pay.

The user questions the customer about his or her positive auto credit and based on the response selects one of selections none 136, 1 good car credit 138, 1 good in house 140, 2 good car credits 142, and 2 good in house 144. The bubble text for the selection may define the selection as meaning good car credit only—consider all good car credit in last seven years.

Next the user asks the customer about the number of times his or her vehicle has been repossessed and based on the answer selects one of selections 3 or more ever 146, 3 in 3 years 148, 2 in 3 years 150, 1 in 3 years 152 and 0 154. The bubble text for the selection may define the selection as meaning the number of times repossessed in the defined date ranges.

The user queries the customer about the amount of time he or she has been listed in a credit bureau and based on the response selects one of selections 0-5 years 156, 6-10 years 158, 11-20 years 160, 21-30 years 162 and 30+ years 164. The bubble text for the selection may define the selection as meaning the length of time since first good credit of any kind was established.

The user next inquires of the customer his or her Beacon score and based on the response selects one of selections 0-425 166, 426-475 168, 476-525 170, 526-575 172 and 576+ 174. The bubble text for the selection may define the selection as meaning the credit score supplied by representative credit reporting agencies and should be averaged if using more than one bureau score.

Rather than question the customer to elicit the information needed to input into the program, the user could obtain the information from one or more credit reports issued by a credit agency or bureau. Alternatively, the user could question the customers and view the credit reports to obtain the necessary information.

Based on all of the prior information inputted into the program, the program calculates a stability credit score which is displayed in stability score box 178.

Again with reference to FIGS. 3A-3D, the user continues to input customer and vehicle information into the program by selecting one of selections all others 180 and specific vehicle make 182 of the vehicle the customer wishes to purchase (specific vehicle make 182 may be pre-programmed into and appear in the screen display of the program depending on the make sold by the particular dealer or dealer location). The bubble text for the selection may define the selection as meaning type of vehicle.

The mileage of the vehicle is inputted by selecting one of selections 120K+ 184, 120K-100K 186, 100K-80 K 188, 80K-70K 190, and 70K-60K 192 (for used cars). The bubble text for the selection may define the selection as meaning mileage showing on vehicle at time of prospective sale.

The capitalized costs or sales price of the vehicle is inputted by selecting one of selections $11001+ 194, $11000-$9501 196, $9500-$8501 198, $8500-$7501 200, and $7500-$0 202. The bubble text for the selection may define the selection as meaning capitalized cost minus any cap cost reduction.

The due at signing or down payment is inputted by selecting one of selections $500-$999 204, $1,000-$1,499 206, $1,500-$2,249 208, $2,250-$2,999 210, and $3,000 212. The bubble text for the selection may define the selection as meaning total due at signing including first payment, fees, cap cost reduction, and security deposit.

The percentage of actual vehicle cost or ACV is inputted by selecting one of selections 21-25% 214, 26-35% 216, and 36%+ 218. The bubble text for the selection may define the selection as meaning due at signing by actual cost of vehicle including make ready.

The customer's percentage of expendable income is inputted by selecting one of the selections 50-45% 224, 40-44% 226, 35-39% 228, and 30-34% 230. The bubble text for the selection may define the selection as meaning percentage of expendable income.

Based on all of the information inputted into the program from the vehicle type selection through the percentage of expendable income selection, the program calculates a deal structure score which is displayed in deal structure score box 232. The program combines the stability score and the deal structure score to generate the credit score which is displayed in credit score box 234. Cancel button 236 may be activated to delete the inputted information. The inputted information may be saved into the database of the program by clicking on save credit sheet 238.

The credit score of a customer is used by the user or administrator (e.g., sales personnel, manager or supervisor) to evaluate the creditworthiness of the customer so that the user or administrator may decide whether or not to provide financing to the customer and the terms of such financing (including the amount of a down payment). The credit score also enables the user or administrator to decide whether or not the customer can afford the vehicle the customer wishes to purchase or whether a vehicle of lesser value should be purchased that would be more affordable to the customer with a greater chance the customer will not default on the loan. The credit score may range from 100 to 800 points. A credit score in the range of 100 to 300 is considered a low score indicating the customer has a higher risk of defaulting on a loan. A credit score in the range of 300 to 600 is considered an average score indicating a medium risk of default. A credit score in the range of 600-800 is considered a high score indicating a lower risk of default.

The program is also capable of tracking the profitability of vehicle sales and financing so that the administrator is able to determine whether the dealer has incurred a loss or realized a profit from each transaction. To access the profitability functions of the program, the user activates underwriting analysis button 14 as shown on FIG. 1. Clicking on button 14 causes the display of underwriting screen 290 as seen in FIGS. 4A-4B.

Figure 4A:
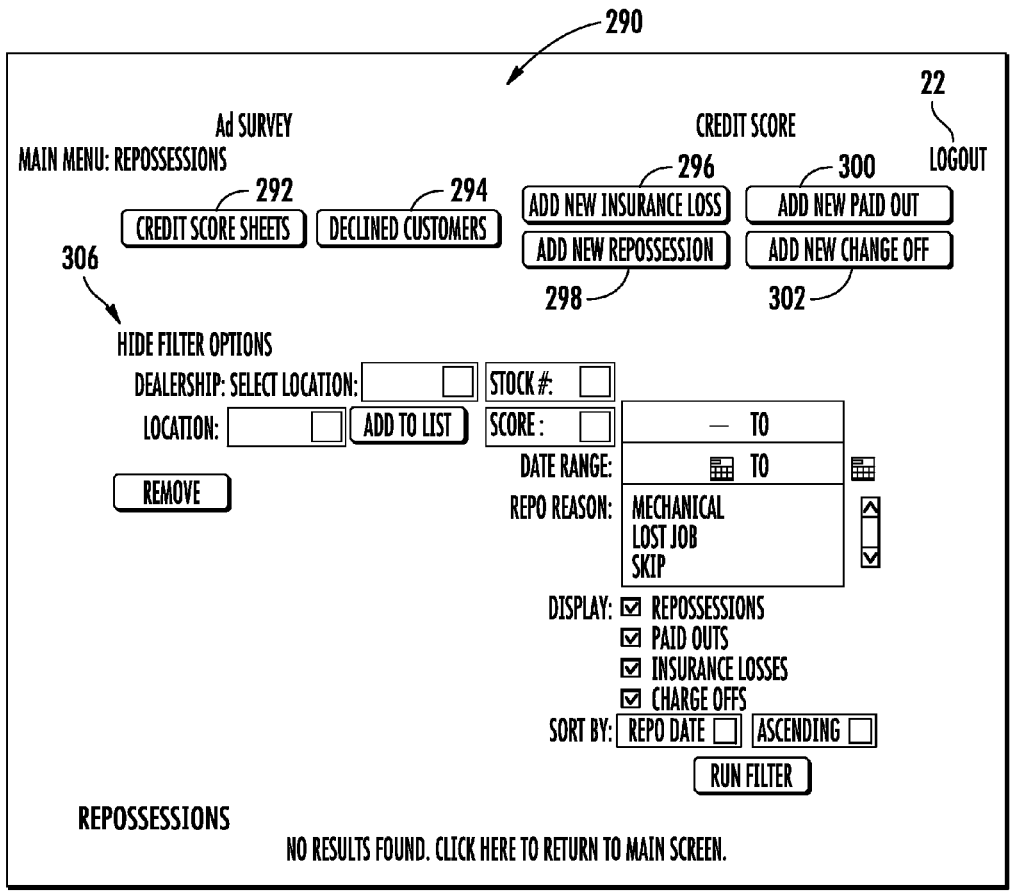
FIGS. 4A-4B is an embodiment of an underwriting or repossessions screen of the program.
Figure 4B:
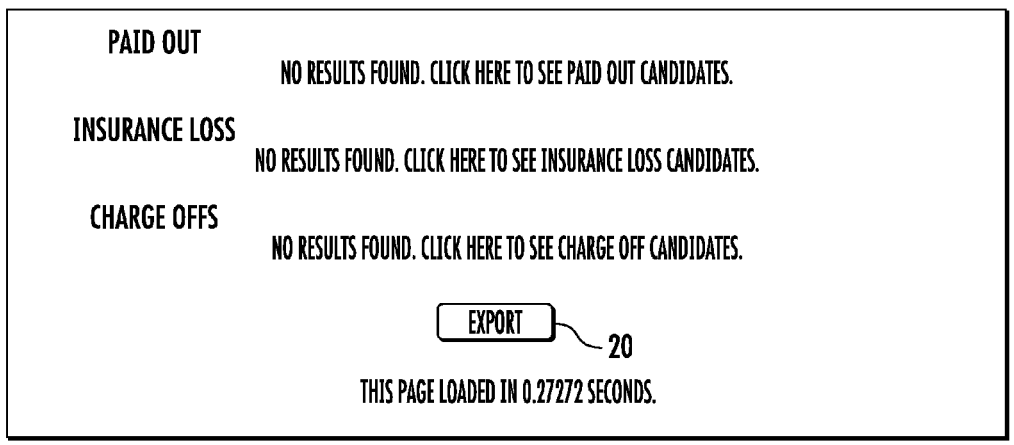

As shown in FIGS. 4A-4B, screen 290 contains credit score button 292, declined customers button 294, add new insurance loss button 296, add new repossession button 298, add new paid out button 300 and add new charge off button 302. Screen 290 also contains filtering or search means 306, which will be explained herein. Should a financed vehicle be involved in an accident and suffer damages, the loss may be recorded into the database of the program. The user would click on add new insurance loss button 298, which will cause insurance loss candidates screen 308 to be displayed as seen in FIG. 5.

With reference to FIG. 5, screen 308 includes credit score button 292, declined customers button 294, and repossessions button 310. Screen 308 also includes customer filtering or search means 312. Search means 312 provides a mechanism to search through the database to identify customers who have purchased vehicles. Search parameters may be used by entering information into search means 312. For example, the dealership may be selected from dealership drop down menu 316. A specific dealership location or locations may be selected from location drop down menu 318 and then added into list box 320 by clicking on add to list button 322. A location may be removed from list box 320 by highlighting the entry and clicking on remove button 324. Search means 312 permits the search parameter to be narrowed to individuals by entering a person's last name in last name box 326. The search may be conducted of records from a certain time period by entering the start date in start date box 328 and the end date in end date box 330. The search parameters may also include the user or users who entered the customer credit score by selecting the user from scored by box 332. The search can also be restricted by customer zip code by entering the zip code in zip box 334. The search is generated by activating run filter button 336. The results of the search appear in list or results area 338. Entry of a new insurance loss is undertaken by clicking on the affected customer from the names set forth in list or results area 338, which will cause insurance loss form screen 340 to be displayed as seen in FIG. 6.

Figure 6:
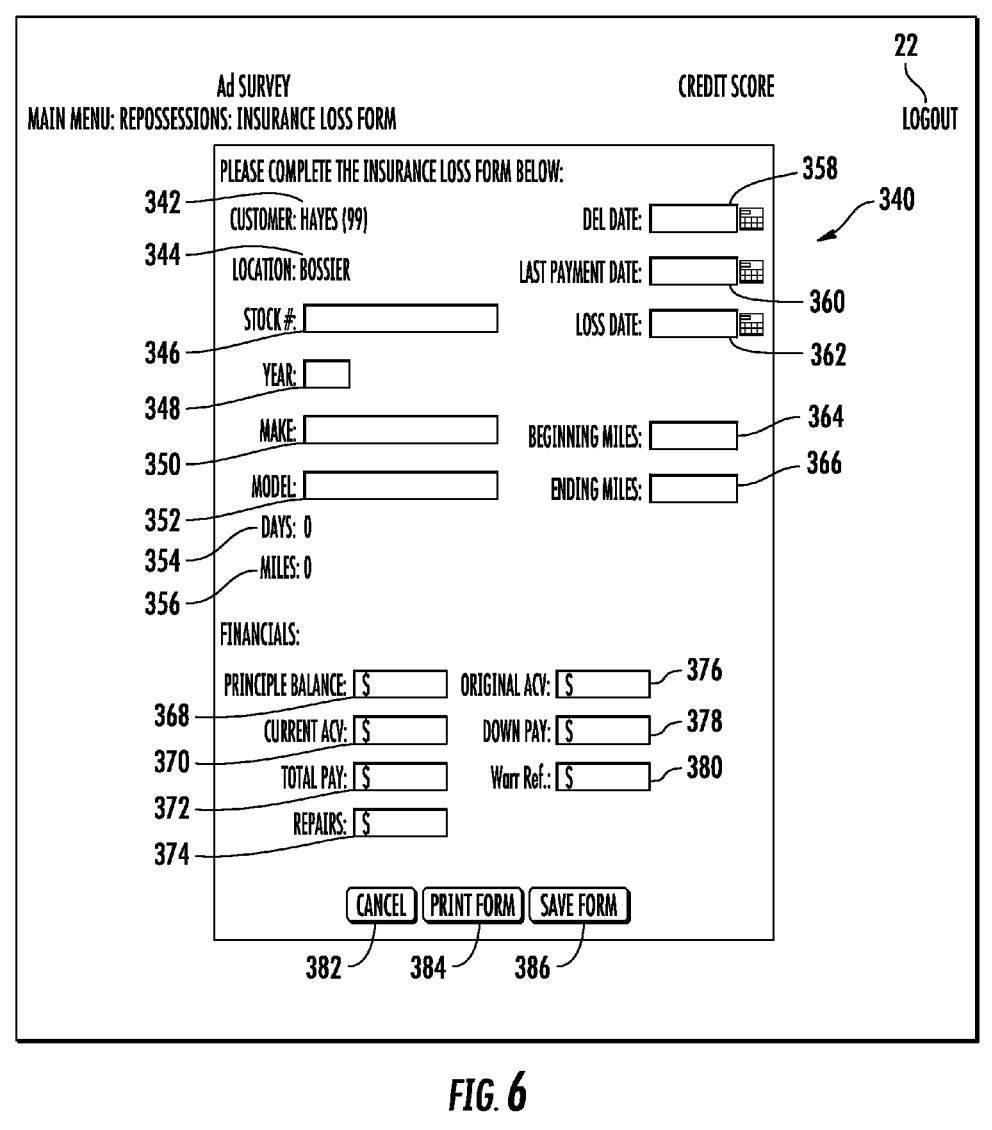

FIG. 6 shows that the customer's name appears in customer box 342 and the dealership location appears in location box 344. To complete the form, the user enters the stock number of the vehicle in stock number box 346, the vehicle year is entered in year box 348, the vehicle make is entered in make box 350, the vehicle model is entered in model box 352, the number of days the vehicle has been in the possession of the customer is entered in days box 354, and the number of miles put on the vehicle while in the possession of the customer is entered in miles box 356. The user also enters the delivery date of the vehicle in del date box 358, the last date payment was made on the vehicle in last payment date box 360, the date the accident occurred in loss date box 362, the beginning miles at the time of sale in beginning miles box 364 and the ending miles at the time of the loss in ending miles box 366. Finally, the user inputs the financial information about the vehicle by entering the principal balance of the loan in principle balance box 368, the current actual cost of the vehicle in current ACV box 370, the total amount paid on the vehicle in total pay box 372, the costs of the repairs necessary to fix the vehicle in repairs box 374, the original actual cost of the vehicle in original ACV box 376, the down payment amount in down pay box 378 and the warranty amount paid for in wan ref box 380. Should the user wish to cancel the entries, cancel button 382 may be activated by clicking thereon. Print form button 384 may be clicked on to print the form. The user saves the entries by clicking on save form button 386 which stores all of the information in the database of the program.

Customers who fail to timely pay their loan obligations will have their vehicle repossessed if it can be located. Repossession information is entered into the database by clicking on add new repossession button 298 as seen in FIG. 4A. This will cause add new repossession screen 390 to be displayed as shown in FIG. 7.

Figure 7:
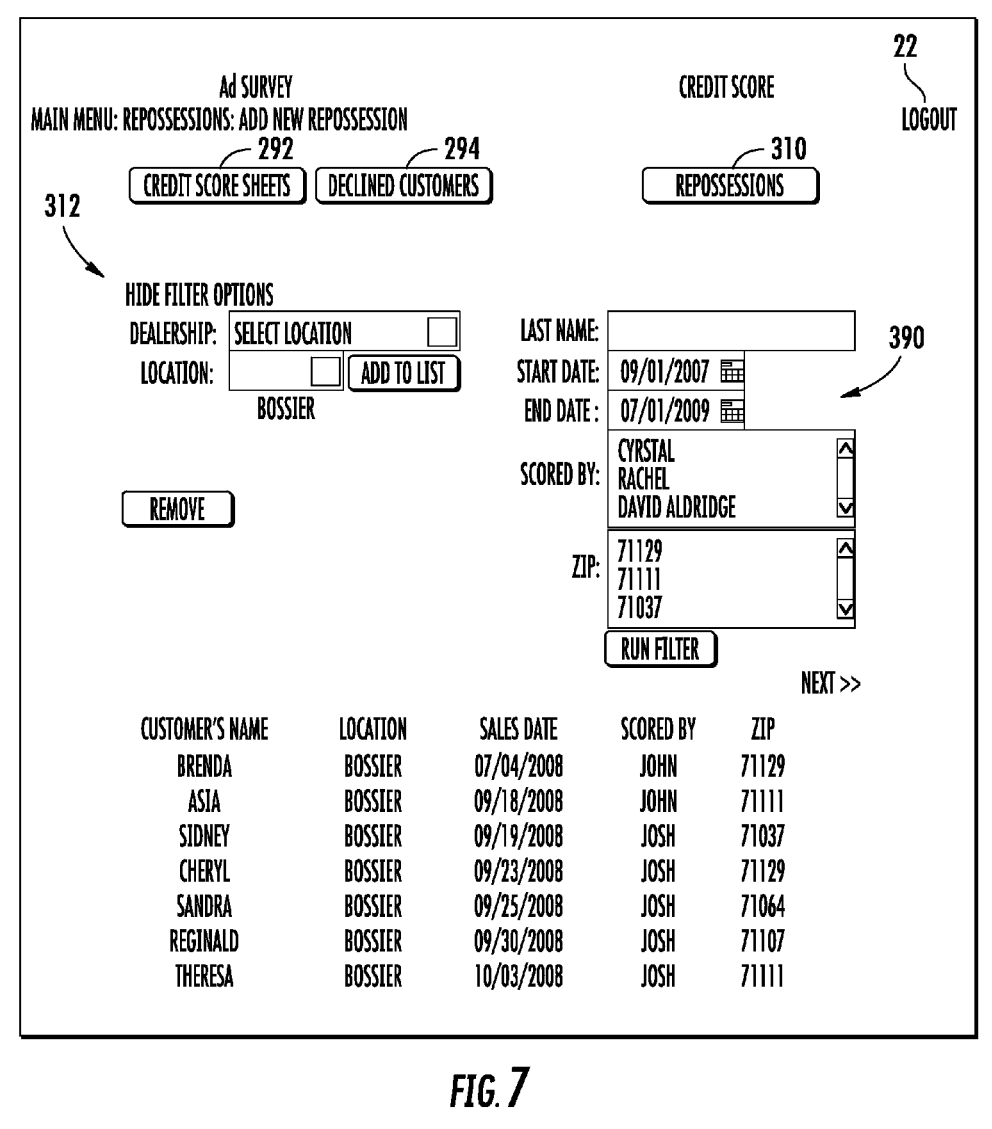

With reference to FIG. 7, screen 390 contains credit score sheets button 292, declined customers button 294, repossessions button 310, and search means 312 for searching for customers who have purchased vehicles as described previously. To enter repossession information, the customer whose vehicle was repossessed is clicked on, which will cause the display of add/edit repossession form 392 as seen in FIGS. 8A-8B.

Figure 8B:
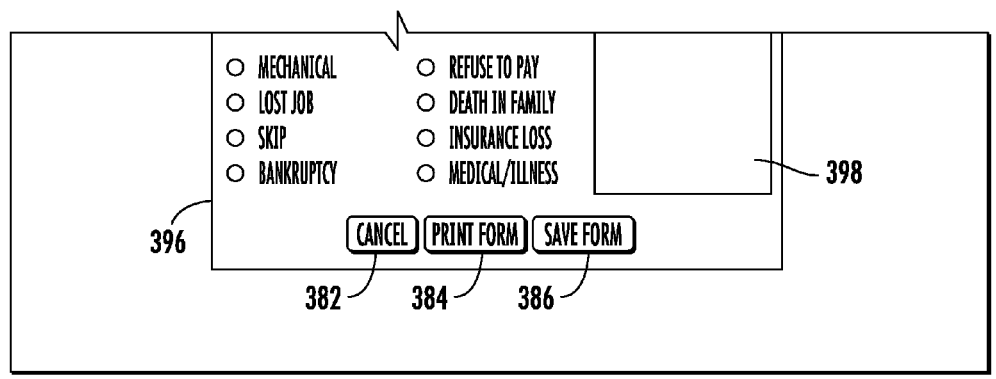

As revealed in FIGS. 8A-8B, screen 392 contains all of the same entries as provided in screen 340 with the exception of the entry for the date of repossession of the vehicle, which is entered in repo date box 394. Additionally, screen 392 contains reason repossessed box 396 which requires the user to select a reason for repossession among the following selections: mechanical; lost job; skip; bankruptcy; refuse to pay; death in family; insurance loss; medical/illness. Details of the reasons for repossession may be further explained by entering text within box 398. The inputted information may be canceled, printed or saved using the appropriate buttons 382, 384, 386.

If the customer pays off the loan, the pay-out information may be recorded in the database. Such information may be inputted into the system by first clicking on add new paid out button 300 as seen in FIG. 4A. This will cause the display of paid candidates screen 400 as seen in FIG. 9.

With reference to FIG. 9, screen 400 contains credit score sheets button 292, declined customers button 294, repossessions button 310, and search means 312 for searching for customers who have purchased vehicles as described previously. To enter paid out information, the customer who paid out is clicked on, which will cause the display of paid form screen 402 as seen in FIG. 10.

Figure 10:
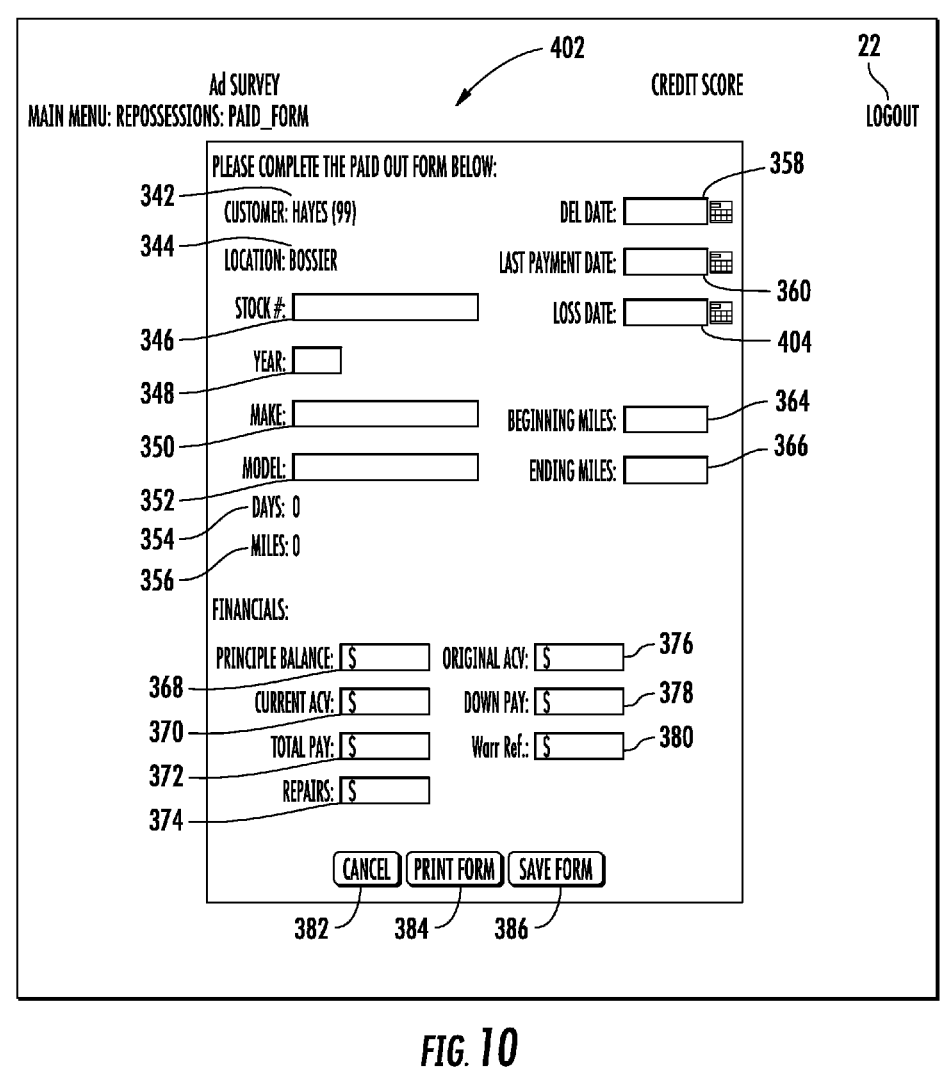

FIG. 10 illustrates that screen 402 contains all of the same entries as provided in screen 340 or 392 with the exception of the date the loan was paid in full, which date is entered in paid date box 404. The inputted information may be canceled, printed or saved using the appropriate buttons 382, 384, 386.

If the customer defaults on the loan but the vehicle is unable to be repossessed (e.g., customer absconds with the vehicle), the vehicle is charged off and the charge off recorded in the database. Such information may be inputted into the system by first clicking on add new charge off button 302 as seen in FIG. 4A. This will cause the display of charge candidates screen 406 as seen in FIG. 11.

With reference to FIG. 11, screen 406 contains credit score sheets button 292, declined customers button 294, repossessions button 310, and search means 312 for searching for customers who have purchased vehicles as described previously. To enter the charge off information, the customer from whom the vehicle cannot be repossessed is clicked on, which will cause the display of charge form screen 408 as seen in FIG. 12.

Figure 12:
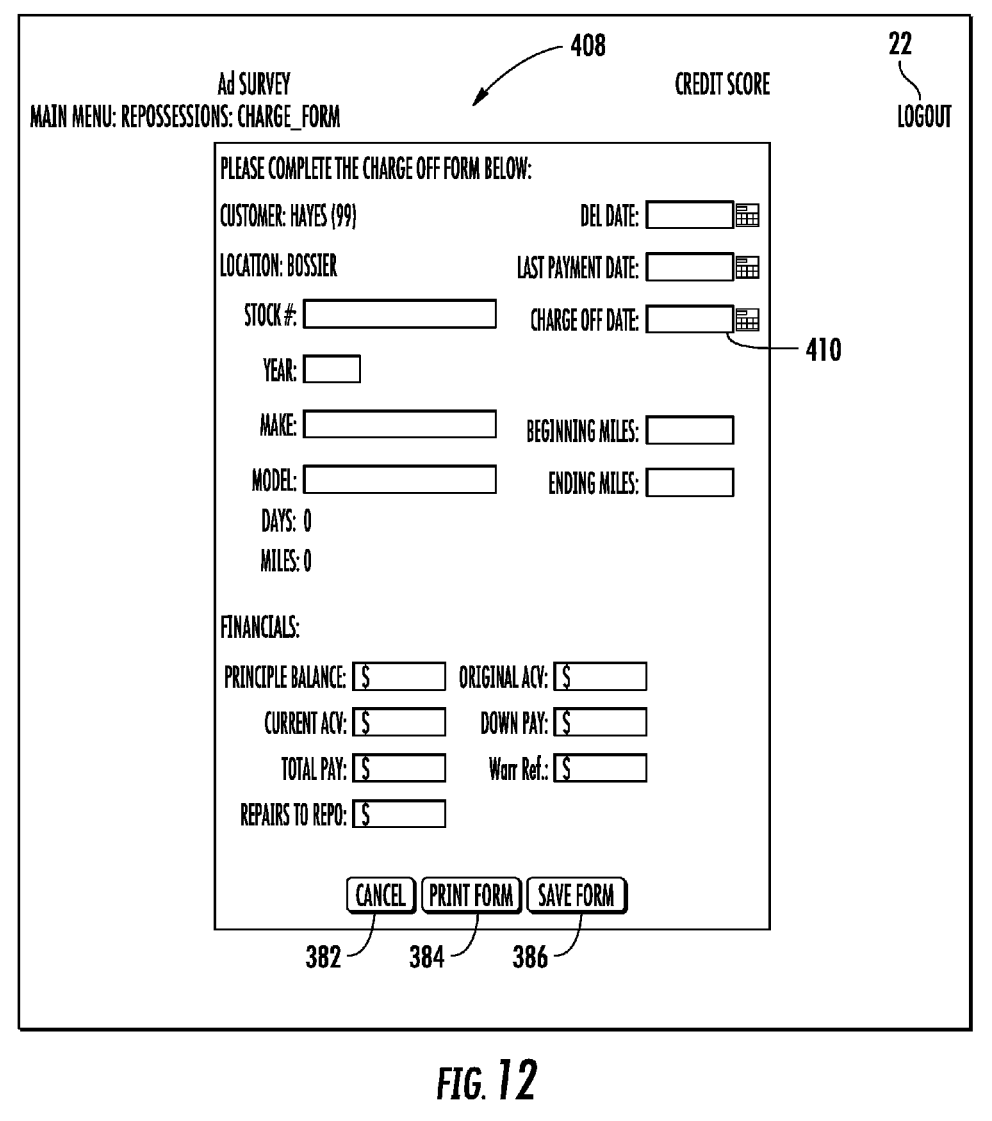

FIG. 12 shows that screen 408 contains all of the same entries as provided in screen 340, 392, 402 with the exception of the date the charge off is made, which date is entered in charge off date box 410. The inputted information may be canceled, printed or saved using the appropriate buttons 382, 384, 386.

By clicking on declined customers button 294, declined forms screen 412 is displayed as shown in FIG. 13. Screen 412 contains customer filter or search means 414, which functions similar to the other search means mentioned herein and lists the customers entered into the system. The list of customers also includes the date a customer was declined financing. If a customer entered into the system is declined financing, such information can be inputted into the database by clicking in the customers name which will cause add/edit decline form screen 416 to be displayed.

As seen in FIGS. 14A and 14B, screen 416 includes customer name box 418 in which the customer's name will appear. The location of the dealership will appear in location box 420. The customer's address is entered in address section 422 which includes street, city, state and zip code. The name of the contact person at the credit agency used to supply a credit report is listed in notice contact box 424, which may have a drop down menu. The name of the credit agency is entered in credit agency box 426, which also may be a drop down menu. The date the customer applied for financing is entered in application date box 428. The date the customer's request for financing is declined is entered in decline date box 430. The date the declined credit form is created is displayed in date created box 432 and the date the form was last edited is displayed in last edited box 434. If the decision to decline credit is based on a credit agency report, box 436 is checked or selected. If the decision to decline credit is based on some other source besides a credit agency report, box 438 is checked or selected. The reason for the decline of credit is selected from reasons declined section 440, which includes as reasons: credit application incomplete; temporary residence; insufficient number of credit references provided; unable to verify residence; unacceptable type of credit references provided; no credit file; unable to verify credit references; limited credit experience; length of employment; poor credit performance with us; income insufficient for amount of credit required; delinquent past or present credit obligations with others; excessive obligations in relation to income; garnishment, attachment, foreclosure, repossession, collection action or judgment; unable to verify income; bankruptcy; length of residence; value o type of collateral not sufficient; inadequate cash down payment or trade-in; and other. The inputted information may be canceled, printed or saved using the appropriate buttons 382, 384, 386.

Figure 15A:
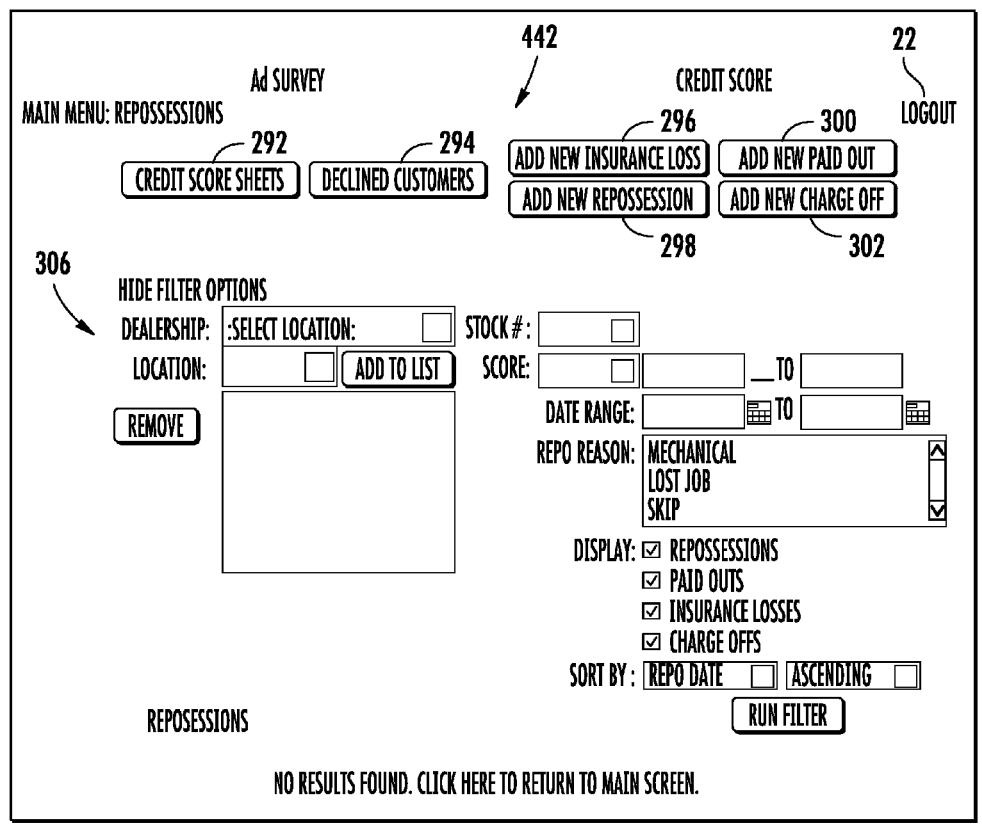
FIGS. 15A-15B is an embodiment of a repossessions or underwriting screen of the program.
Figure 15B:
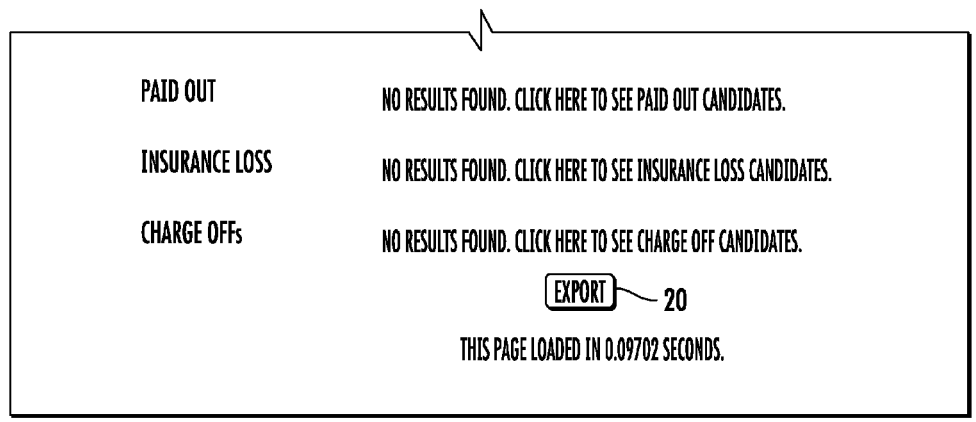

If the user wishes to search for information on customer repossession, the user may click on repossessions button 310 which appears on various screens of the program including the insurance loss candidates screen 308 as seen in FIG. 5. Activating button 310 will cause the program to display repossession screen 442 as shown in FIGS. 15A-15B. Screen 442 is identical to underwriting screen 290 that is displayed when underwriting button 14 is activated by clicking thereon. The functional capabilities of search means 306 will be explained below.

Figure 16:
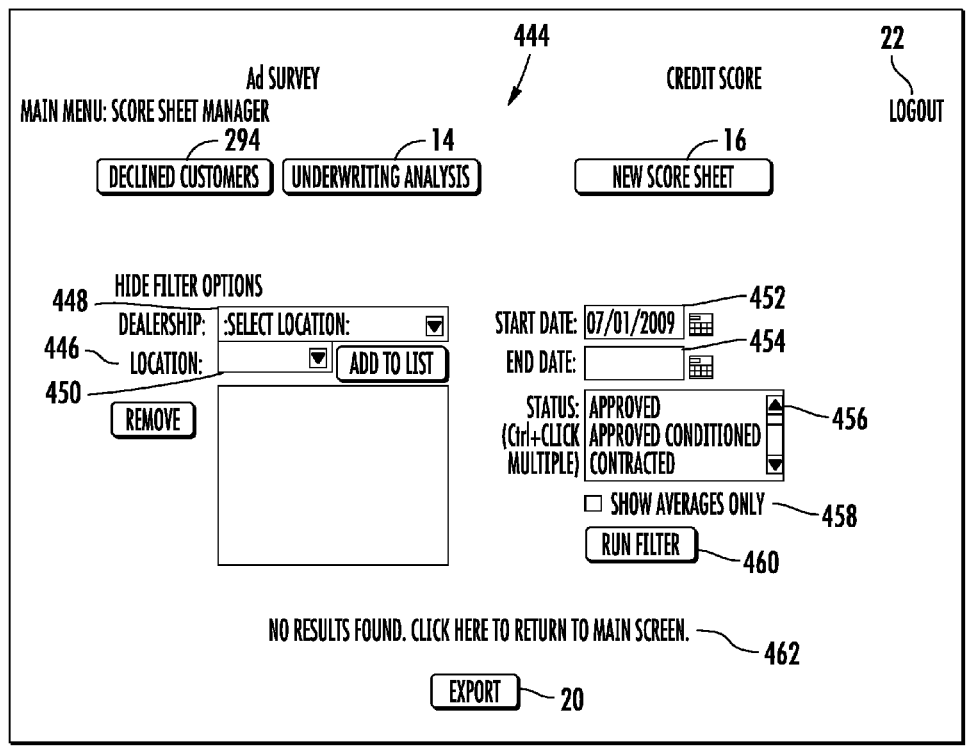
FIG. 16 is an embodiment of a score sheet manager screen of the program.

Credit score information for customers is viewable by clicking on credit score sheets button 292 as seen in FIG. 4A. This will cause score sheet manager 444 to be displayed as shown in FIG. 16. Screen 444 includes credit status filter or search means 446 which permits the user to construct searches for all customers in the system by dealership and/or dealership location using dealership box 448 and location box 450, by period of time using start date box 452 and end date box 454, and by status using one or more of the identified status indicators set forth in status box 456 such as approved, approved conditioned, contracted, declined, insurance loss, paid out, pending, and repossessed. The search is generated by clicking on run filter button 460. If averages are desired, show averages only box 458 may be selected. The results will be listed in results box 462.

Figure 17:
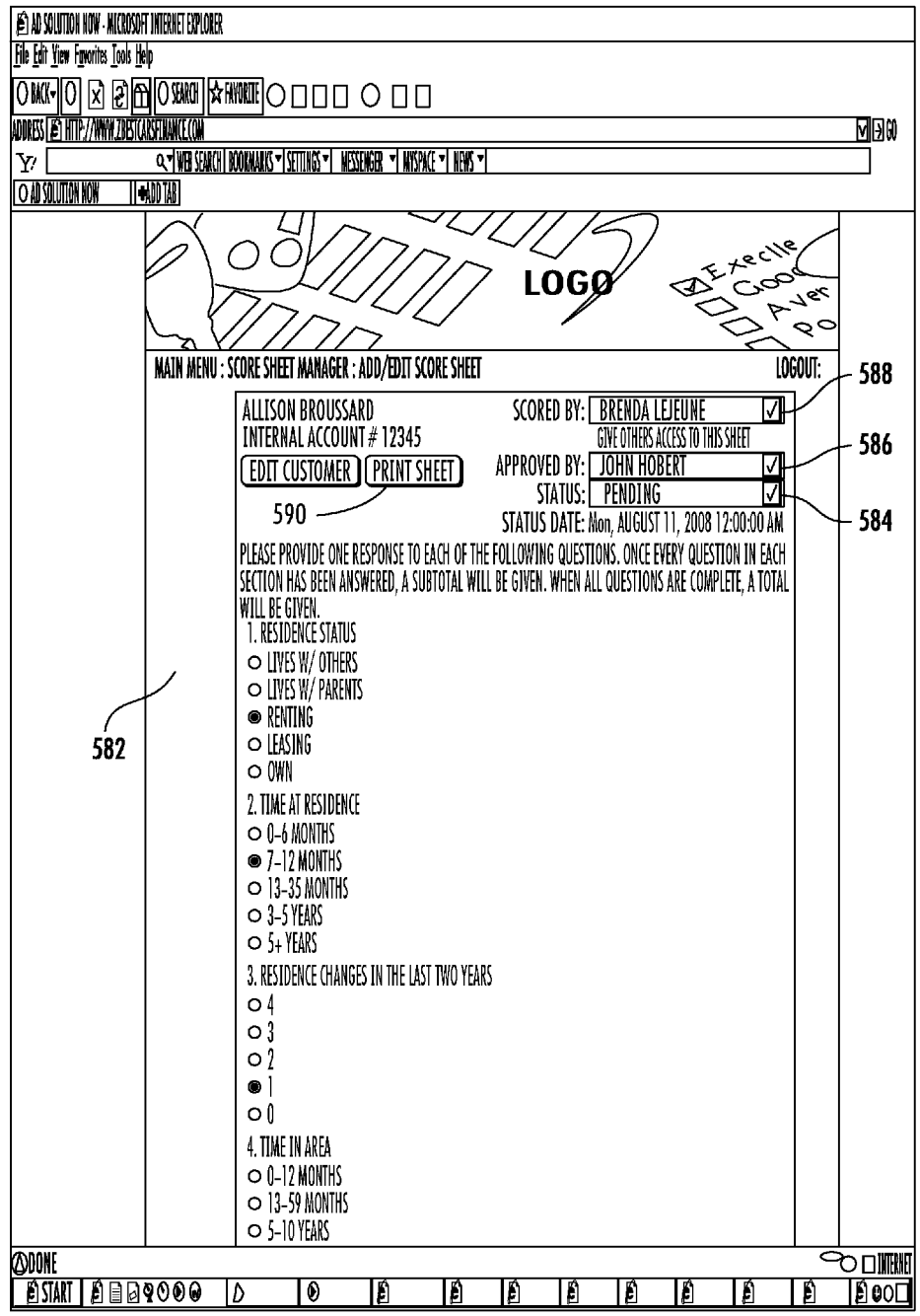
FIG. 17 is an embodiment of an add/edit score sheet form screen of the program.

Credit status may be recorded in the system or database by clicking on a customer identified in box 462 which will cause add/edit score sheet screen 582 to be displayed as shown in FIG. 17. FIG. 17 reveals that screen 582 includes status drop down menu box 584. By selecting from the drop down menu of box 584, the status of the dealership's financing and other information for a customer may be inputted into the system. Choices include approved, approved conditioned, contracted, declined, insurance loss, paid out, pending, and repossessed. The person approving the financing may be inputted into the system by selecting a name from drop down menu box 586. The person that scored the customer is selected from drop down menu box 588. The sheet may be printed by clicking on print sheet button 590. The sheet may be edited by clicking on edit customer button 592.

The program is capable of generating profitability data to enable the administrator or dealer to make financial decisions about the business such as whether a particular transaction with a customer has generated a profit or loss for the dealership. Based on such information, the dealer can decide, for example, whether a particular dealership or dealership location is profitable to the operation of the business, whether particular terms of financing for particular vehicles are profitable, whether a particular make or model of vehicle is more profitable than others, whether particular terms of financing for a particular circumstance (e.g., repossession, paid out, insurance loss, and/or charge off) are profitable. The business operations can be modified based on the results generated to increase profitability. Profitability data may be generated by activating underwriting analysis button 14 on screen 10 to display underwriting or repossessions results screen 290 as shown in FIGS. 18A-18N.

Figure 18A:
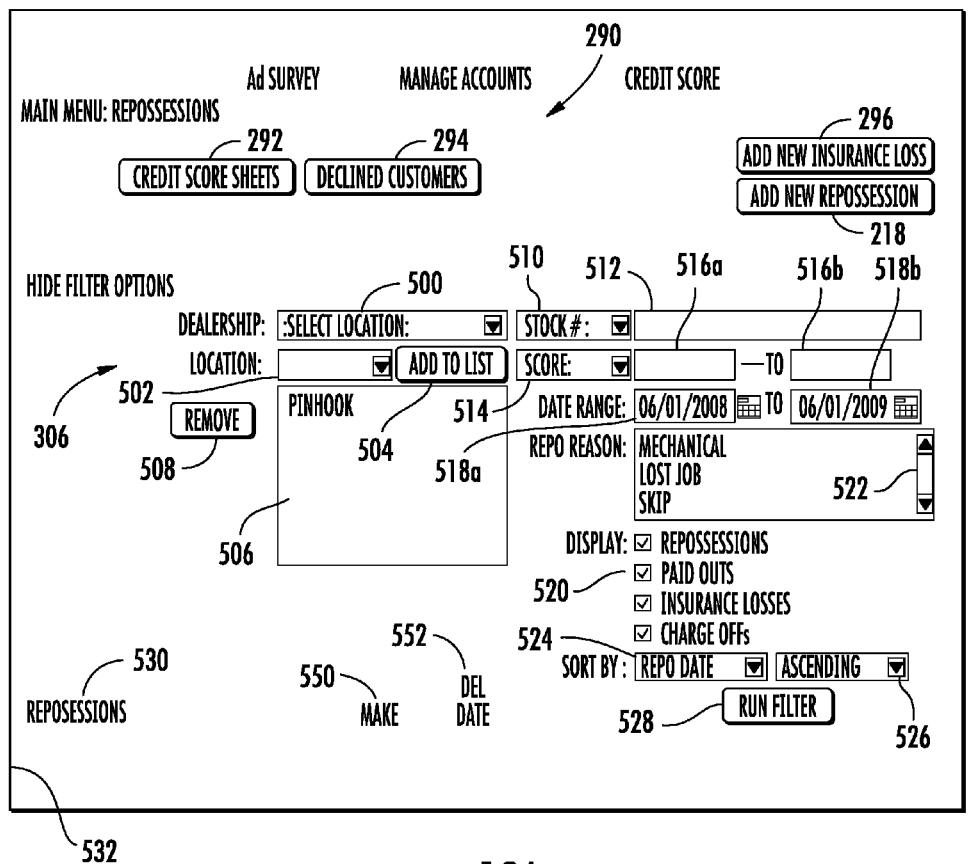
Figure 18Q:
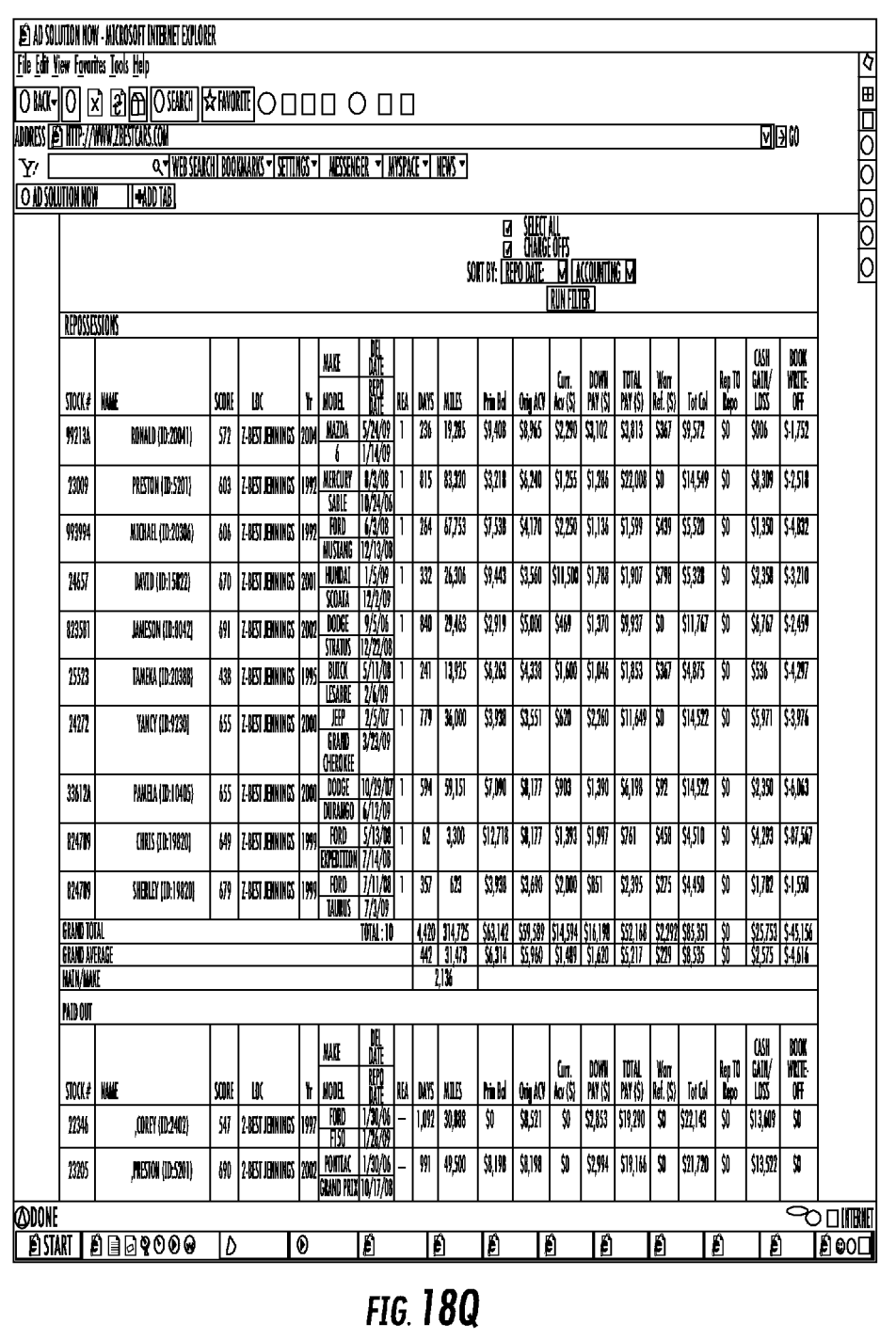

With reference to FIGS. 18A-18P, filter or search means 306 permits the user or administrator to construct searches of the database for desired customer information. By selecting a dealership from dealership drop down menu 500, the search can cover all or a select dealership. By selecting a dealership location from location drop down menu 502 and adding the location to add box 506 by clicking on add to list button 504, the search may be restricted to one or more dealership locations. Locations may be removed from add box 506 by highlighting the location and clicking on remove button 508. The search parameters can also be modified by selecting stock number, name, year, make or model from box 510 which will appear in box 512. The search can also be limited by selecting a credit score from box 514 or entering a range of credit scores in range box 516a and 516b. The search can be restricted to a period of time by entering date ranges in date range box 518a and 518b. The search may be adjusted to cover one or more of the following selections: repossessions; paid outs; insurance losses; and charge offs, which appear in display box 520 and may be selected by checking the appropriate selection or selections. If repossession is selected, the search may be further modified to search for one or more of repossession reasons listed in repo reason box 522, which selections include mechanical, lost job, skip, bankruptcy, refuse to pay, insurance loss, medical/illness. Sorting of the results displayed may be chosen by selecting the following selections in sort by drop down menu 524: repo date; reason; days; miles; prior balance; original ACV; current ACV; down payment; total pay; wan ref.; total collected; rep to repo; cash gain/loss; and book write off. The results can be displayed in ascending or descending order based on the selection made in order box 526. Activating run filter button 528 by clicking thereon will generate the search results, which are shown in results section 530. Section 530 shows inputted numbers or amounts for all criteria except for total collected; rep to repo; cash gain/loss; and book write off. It is to be understood that such inputted numbers or amounts will appear in section 530. For example, FIG. 18Q shows inputted numbers or amounts for total collected; rep to repo; cash gain/loss; and book write off.

It is to be understood that the search results shown in section 530 of FIGS. 18A-18N are representative only. The results were generated from search parameters that included one location of one dealership, a specified date range, and the selections of repossessions, paid outs, insurance loss and charge offs. The search results shown in section 530 depend on the information inputted into the system and the parameters used to generate the search as described above.

As shown in FIGS. 18A-18N, the results displayed in section 530 may include repossession section 532, paid out section 534, insurance loss section 536, and charge off section 538. Each of sections 532, 534, 536, 538 contains columns within which the specified information is displayed. The stock number for the vehicle is presented in stock # column 540. The name and ID number of the customer is presented in name column 542. The customer's credit score is shown in score column 544. The location of the dealership is set forth in loc column 546. The year of the vehicle is shown in yr column 548. The make and model of the vehicle is listed in make model column 550. The delivery and repossession date (if any) of the vehicle is presented in del repo date column 552. The reason for the repossession is listed as a number which corresponds to a reason (e.g., mechanical, lost job, etc.) in rea column 554. The number of days the vehicle was in the customer's possession is presented in days column 556. The number of miles put on the vehicle while in the customer's possession is shown in miles column 558. The principal balance of the loan is shown in prin bal column 560. The original actual cost of the vehicle (the amount paid by the dealer) is listed in original ACV column 562. The current actual cost of the vehicle (after depreciation) is shown in curr. acv ($) column 564. The down payment made on the vehicle is presented in down pay (4) column 566. The total amount of payments made by the customer is shown in total pay (4) column 568. The amount paid for an extended warranty is set forth in wan ref. ($) column 570. The amount of total revenues collected by the dealer (i.e., total of current ACV, down payment, total loan paid and warranty amount paid) is shown in tot col. column 572. The amount spent on repairs to the vehicle until reposition is shown in rep to repo column 574 (repair costs may also be captured as part of current ACV). The profit made or loss sustained by the dealer is presented in cash gain/loss column 576, which is calculated by subtracting the original ACV from column 562 from the total revenues collected from column 572. The amount that may be written off as a loss is shown in book write off column 578. The amount written off as a loss may include depreciation of the vehicle and any uncollected sums due under the loan.

As also shown in FIGS. 18A-18P, each section 532, 534, 536, 538 includes grand total section 580 that includes the total number of entries in each section and calculates and displays the total of each of columns 556 through 578. An average of the totals calculated for columns 556 through 578 is also provided. The amount of miles set forth in column 558 is also calculated on a per month basis and displayed.

FIG. 19 illustrates an example of the hardware associated with the present invention. The program may be stored on server 256. While server 256 is shown, the program could be stored on any type of computer storage device such as a CPU. The hardware includes work stations 258, 260, 262, 264. Work stations 258, 260, and 262 may each be located within a single dealership or in separate dealerships operated by the same business. Workstations 258 may be used to enter customer information at the point of sale and therefore is located at a dealership location. Workstation 258 may include hard-drive 266 and operatively connected computer display screen 268. Workstation 260 may also be used to enter customer information at the point of sale and therefore is also located at the dealership location. Workstation 260 may include hand-held device 270, which may be a hand-held PC with a display screen. Workstation 262 may be used to generate reports and therefore may be an administration station located at the dealership location or off-site at the business's headquarters. Workstation 262 may include hard-drive 272 and computer display screen 274. Workstation 264 may be used to enter customer information at the point of sale but at a separate dealership location. Workstation 264 may include hard-drive 276 and computer display screen 278.

The computers at workstations 258, 260, and 264 may be configured for use by employees working at the dealership locations such as sales personnel 280 who are involved in selling or leasing a vehicle to customers. The computer at workstation 262 may be configured for use by authorized administrator 286 such as a manager who has the need to generate reports and make marketing decisions for the business. The computers at workstations 258, 260, and 264 may be operatively connected (via a network) to printers 282 for printing survey results. Although not shown, workstation 262 may also be operatively connected to a printer for printing reports. Through server 256, workstations 258, 260, 262, 264 and printers 282 may be networked. The network may be networked via hardwire, wireless, internet or other network configurations. Preferably, the program is web-enabled. Server 256 may be remotely located from workstations 258, 260, 262 and 264. Workstations 258, 260, 262 and 264 are able to access the program on server 256 via the internet with the entry of identity and pass code information to verify that the user is authorized. It is to be understood that the hardware represented in FIG. 19 is only an example, other hardware, workstations, and printers may be used as part of the system both on-site and off-site.

While preferred embodiments of the present invention have been described, it is to be understood that the embodiments described are illustrative only and that the scope of the invention is to be defined solely by the appended claims when accorded a full range of equivalents, many variations and modifications naturally occurring to those skilled in the art from a perusal hereof.

What is claimed is:

1. A method of determining credit worthiness of a new customer for financing transactions and profitability of said financing transactions of a business, comprising the steps of:

a) providing a computer program stored on a computer storage device of a computer system, which further comprises a display, an input device, and a computer processor each operatively connected to said computer storage device, said computer program generating a customer information screen on said display with said computer processor and comprising a database of data from a plurality of customers of said business, wherein said data in said database includes credit information about said customers and a plurality of customer data entries;

b) logging into said computer program using said input device;

c) viewing said customer information screen on said display;

d) inputting a customer data set about said new customer into said customer information screen using said input device, wherein said customer data set includes information about said new customer's credit worthiness;

e) inputting a financing data set about a proposed financing transaction with said new customer into said customer information screen using said input device, wherein said financing data set includes information about the terms of said proposed financing transaction and information about a proposed product to be purchased in said proposed financing transaction;

f) generating a credit score based on said customer data set and said financing data set with said computer program and said computer processor, said credit score displayed on said customer information screen on said display; and g) storing said customer data set, said financing data set, and said credit score of said new customer as a new customer data entry in said database on said computer storage device.

2. The method of claim 1, wherein in step (f) said computer program generates a stability score based on said customer data set and a deal score based on said financing data set, and wherein said computer program generates said credit score based on said stability score and said deal score.

3. The method of claim 1, wherein said customer information screen comprises a plurality of customer questions and a mechanism for selecting one or more answers of said new customer from a plurality of available answers to each of said plurality of customer questions, and wherein said customer data set comprises selections from said plurality of available answers to each of said plurality of customer questions.

4. The method of claim 3, wherein said plurality of customer questions on said customer information screen comprises a set of residence questions, a set of employment questions, and a set of credit questions.

5. The method of claim 4, wherein said set of residence questions includes a residence status, a time in residence, a number of recent residence changes, and a time in area.

6. The method of claim 4, wherein said set of employment questions includes a length of employment, a number of recent changes in employment, a number of employment lapses, and a gross monthly income.

7. The method of claim 4, wherein said set of credit questions includes a number of positive auto credits, a number of repossessions, a time in a credit bureau, and a credit bureau score.

8. The method of claim 3, wherein said customer information screen further comprises a mechanism for inputting identifying information about said new customer, and wherein said customer data set further comprises said identifying information.

9. The method of claim 8, wherein said identifying information includes a name, an age, a business location, and a zip code.

10. The method of claim 1, wherein said customer information screen comprises a plurality of financing questions and a mechanism for selecting one or more answers of said proposed financing transaction from a plurality of available answers to each of said plurality of financing questions; and wherein said financing data set comprises selections from said plurality of available answers to each of said plurality of financing questions.

11. The method of claim 10, wherein said plurality of financing questions on said customer information screen comprises a set of product questions and a set of financial questions.

12. The method of claim 11, wherein said set of product questions includes a product type and a product condition.

13. The method of claim 12, wherein said proposed financing transaction is a proposed motor vehicle loan, wherein said product type includes a make and a model, and wherein said product condition includes a mileage amount.

14. The method of claim 13, wherein said set of financial questions includes a sales price, a down payment amount, a comparison of said down payment amount and a cost, and a comparison of said down payment amount and an expendable income amount of said new customer.

15. The method of claim 1, further comprising the steps of:

h) viewing said credit score displayed on said customer information screen on said display; and i) deciding whether to extend a financing transaction offer to said new customer based on said credit score, wherein a financing transaction offer is extended if said credit score indicates that said new customer has a low risk of defaulting on a loan, and wherein a financing transaction offer is not extended if said credit score indicates that said new customer has a high risk of defaulting on a loan.

16. The method of claim 15, wherein said computer program generates a declined screen on said display, wherein said decision in step (i) is not to extend said financing transaction offer, and wherein said method further comprises the steps of:

j) navigating to said declined screen within said computer program using said input device;

k) viewing said declined screen on said display;

l) inputting a declined data set about said new customer into said declined screen using said input device, wherein said declined data set includes information about said decision not to extend said financing transaction offer to said new customer.

17. The method of claim 16, wherein said declined screen comprises a mechanism for selecting one or more reasons for said decision not to extend said financing transaction offer to said new customer from a plurality of available reasons, and wherein said declined data set is input by selecting from said plurality of available reasons.

18. The method of claim 17, wherein said plurality of available reasons includes incomplete credit application, temporary residence, insufficient number of credit references, inability to verify residence, unacceptable type of credit references, insufficient income for amount of credit, delinquent credit obligations, excessive obligations in relation to income, collection of other debts, no credit file, inability to verify credit references, limited credit experience, length of employment, poor credit, inability to verify income, bankruptcy, length of residence, insufficient collateral, or inadequate down payment.

19. The method of claim 1, wherein said computer program generates a disposition screen on said display, wherein said method further comprises the steps of:
  h) navigating to said disposition screen within said computer program using said input device;
  i) viewing said disposition screen on said display;
  j) finding and selecting a chosen customer data entry from said plurality of customer data entries stored in said database on said disposition screen using said input device;
  k) inputting a disposition data set for said chosen customer data entry into said disposition screen using said input device, wherein said disposition data set comprises a disposition status for a financing transaction for the chosen customer data entry; and
  l) storing said disposition data set with said chosen customer data entry in said database on said computer storage device.

20. The method of claim 19, wherein step (k) comprises selecting said disposition status for said chosen customer data entry from a plurality of available disposition statuses, and wherein said plurality of available disposition statuses include insurance loss, repossession, paid, and charge off.

21. The method of claim 20, wherein said disposition data set further comprises identifying information about a purchased product, information about a current condition of said purchased product, and information about said financing transaction for said chosen customer data entry.

22. The method of claim 21, wherein repossession is selected as said disposition status in step (k), and wherein said disposition data set further comprises information about a reason for repossession.

23. The method of claim 19, wherein said computer program generates an analysis screen on said display, wherein said method further comprises the steps of:
  m) navigating to said analysis screen within said computer program using said input device;
  n) viewing said analysis screen on said display;
  o) generating a profitability report containing a profitability data set on an analysis set of customer data entries;
  p) viewing said profitability report on said analysis screen on said display.

24. The method of claim 23, further comprising the steps of:
  q) evaluating said profitability report; and
  r) deciding whether to extend a financing transaction offer to a second new customer for a second proposed financing transaction based on said evaluation of said profitability report.

25. The method of claim 23, wherein said profitability data set in said profitability report comprises said customer data set, said financing data set, and said disposition data set.

26. The method of claim 23, wherein said analysis set of customer data entries is selected from said plurality of customer data entries stored in said database using a search mechanism on said analysis screen.

27. The method of claim 1, wherein said computer system comprises a handheld computer device.

28. The method of claim 1, wherein said computer storage device comprises a hard drive.

29. The method of claim 1, wherein said display comprises a computer screen, a television screen, or a handheld display screen.

30. The method of claim 1, wherein said input device comprises a keyboard, a mouse, or a joystick.

31. The method of claim 1, wherein said computer system comprises a touch-screen device.

32. The method of claim 1, wherein said computer storage device comprises a server; wherein said operative connection of said server to said display and said input device comprises a network.

33. The method of claim 32, wherein said network comprises a wireless connection.

* * * * *